US 6,557,119 B1

(12) United States Patent
Edwards et al.

(10) Patent No.: US 6,557,119 B1
(45) Date of Patent: *Apr. 29, 2003

(54) MICROCOMPUTER DEBUG ARCHITECTURE AND METHOD

(75) Inventors: David Alan Edwards, Bristol (GB); Anthony Willis Rich, Cambridge (NZ)

(73) Assignee: STMicroelectronics Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/411,786

(22) Filed: Oct. 1, 1999

(51) Int. Cl.⁷ .................................... G06F 9/45
(52) U.S. Cl. ................ 714/38; 714/31; 714/47; 717/124; 717/129; 717/131
(58) Field of Search .................. 714/37, 38, 39, 714/47, 31; 717/124, 129, 130, 131

(56) References Cited

U.S. PATENT DOCUMENTS

| | | | |
|---|---|---|---|
| 4,814,981 A | | 3/1989 | Rubinfeld .................... 364/200 |
| 4,821,178 A | * | 4/1989 | Levin et al. .................... 714/47 |
| 5,251,311 A | | 10/1993 | Kasai .......................... 395/425 |
| 5,386,565 A | | 1/1995 | Tanaka et al. ............... 395/700 |
| 5,423,050 A | | 6/1995 | Taylor et al. ................ 395/575 |
| 5,434,804 A | | 7/1995 | Bock et al. .................. 364/579 |
| 5,440,705 A | | 8/1995 | Wang et al. .............. 395/421.1 |
| 5,448,576 A | | 9/1995 | Russell ....................... 371/22.3 |
| 5,452,432 A | | 9/1995 | Macachor ................... 395/425 |
| 5,455,936 A | | 10/1995 | Maemura ................. 395/183.11 |
| 5,479,652 A | | 12/1995 | Dreyer et al. .......... 395/183.06 |
| 5,483,518 A | | 1/1996 | Whetsel ........................ 370/13 |
| 5,488,688 A | | 1/1996 | Gonzales et al. .......... 395/183.1 |
| 5,530,965 A | | 6/1996 | Kawasaki et al. .......... 395/800 |
| 5,537,541 A | * | 7/1996 | Wibecan ....................... 714/37 |
| 5,570,375 A | | 10/1996 | Tsai et al. ................... 371/22.3 |
| 5,590,354 A | | 12/1996 | Klapproth et al. .......... 395/800 |
| 5,596,734 A | | 1/1997 | Ferra ........................... 395/825 |
| 5,598,551 A | | 1/1997 | Barajas et al. ............... 395/484 |
| 5,602,729 A | * | 2/1997 | Krueger et al. ................ 714/47 |
| 5,606,566 A | | 2/1997 | Whetsel ..................... 371/22.3 |

(List continued on next page.)

FOREIGN PATENT DOCUMENTS

| | | |
|---|---|---|
| EP | 0 165 600 B1 | 12/1985 |
| EP | 0 165 660 A2 | 12/1985 |
| EP | 0 636 976 B1 | 2/1995 |
| EP | 0 636 976 A1 | 2/1995 |
| EP | 0 652 516 A1 | 5/1995 |
| EP | 0702 239 A3 | 3/1996 |
| EP | 0 702 239 A2 | 3/1996 |
| EP | 0 720 092 A1 | 7/1996 |
| EP | 0 933 926 A1 | 8/1999 |
| EP | 0 945 805 A1 | 9/1999 |
| EP | 0 959 411 A1 | 11/1999 |
| JP | 8320796 A | 12/1996 |
| JP | 8329687 A | 12/1996 |
| JP | 9212358 A | 8/1997 |
| JP | 9311786 A | 12/1997 |
| JP | 10106269 A | 4/1998 |
| JP | 10124484 A | 5/1998 |
| JP | 10177520 A | 6/1998 |
| WO | WO98/13759 | 4/1998 |

OTHER PUBLICATIONS

York, Richard et al. "Real Time Debug for System–on–Chip Devices", Jun., 1999.

*Primary Examiner*—Robert Beausoliel
*Assistant Examiner*—Michael Maskulinski
(74) *Attorney, Agent, or Firm*—Lisa K. Jorgenson; James H. Morris

(57) ABSTRACT

A computer system, comprising at least one central processing unit and a memory unit coupled to the at least one central processing unit, a set of watchpoints defined in the computer system; each watchpoint in the set of watchpoints comprising a programmable precondition register and a programmable action register, a set of latches, and selection circuitry that selects one latch in the set of latches to couple an output of an action register to an input of the selected latch.

35 Claims, 23 Drawing Sheets

U.S. PATENT DOCUMENTS

| | | | |
|---|---|---|---|
| 5,608,881 A | 3/1997 | Masumura et al. | 395/306 |
| 5,613,153 A | 3/1997 | Arimilli et al. | 395/821 |
| 5,627,842 A | 5/1997 | Brown et al. | 371/22.3 |
| 5,657,273 A | 8/1997 | Ayukawa et al. | 365/189.01 |
| 5,659,679 A * | 8/1997 | Alpert et al. | 714/38 |
| 5,682,545 A | 10/1997 | Kawasaki et al. | 395/800 |
| 5,704,034 A | 12/1997 | Circello | 395/183.14 |
| 5,708,773 A | 1/1998 | Jeppesen, III et al. | 395/183.06 |
| 5,724,549 A | 3/1998 | Selgas et al. | 395/468 |
| 5,737,516 A | 4/1998 | Circello et al. | 395/183.14 |
| 5,751,621 A | 5/1998 | Arakawa | 364/748.07 |
| 5,751,941 A * | 5/1998 | Hinds et al. | 714/38 |
| 5,768,152 A | 6/1998 | Battaline et al. | 364/551.01 |
| 5,771,240 A | 6/1998 | Tobin et al. | 371/22.1 |
| 5,774,701 A | 6/1998 | Matsui et al. | 395/556 |
| 5,778,237 A | 7/1998 | Yamamoto et al. | 395/750.04 |
| 5,781,558 A | 7/1998 | Inglis et al. | 371/21.1 |
| 5,796,978 A | 8/1998 | Yoshioka et al. | 395/416 |
| 5,828,825 A | 10/1998 | Eskandari et al. | 395/183.03 |
| 5,832,248 A | 11/1998 | Kishi et al. | 395/376 |
| 5,835,963 A | 11/1998 | Yoshioka et al. | 711/207 |
| 5,848,247 A | 12/1998 | Matsui et al. | 395/284 |
| 5,860,127 A | 1/1999 | Shimazaki et al. | 711/167 |
| 5,862,387 A | 1/1999 | Songer et al. | 395/728 |
| 5,867,726 A | 2/1999 | Ohsuga et al. | 395/800.32 |
| 5,884,092 A | 3/1999 | Kiuchi et al. | 395/800.35 |
| 5,896,550 A | 4/1999 | Wehunt et al. | 395/846 |
| 5,918,045 A | 6/1999 | Nishii et al. | 395/584 |
| 5,930,523 A | 7/1999 | Kawasaki et al. | 395/800.32 |
| 5,930,833 A | 7/1999 | Yoshioka et al. | 711/210 |
| 5,944,841 A | 8/1999 | Christie | 714/38 |
| 5,950,012 A | 9/1999 | Shiell et al. | 395/712 |
| 5,953,538 A | 9/1999 | Duncan et al. | 395/842 |
| 5,956,477 A | 9/1999 | Ranson et al. | 395/183.06 |
| 5,978,874 A | 11/1999 | Singhal et al. | 710/107 |
| 5,978,902 A | 11/1999 | Mann | 712/227 |
| 5,983,017 A | 11/1999 | Kemp et al. | 395/704 |
| 5,983,379 A | 11/1999 | Warren | 714/727 |
| 6,173,386 B1 * | 1/2001 | Key et al. | 714/38 |
| 6,345,295 B1 * | 2/2002 | Beardsley et al. | 714/38 |

\* cited by examiner

| PRECONDITION REGISTER DEFINITION ||||||
|---|---|---|---|---|---|
| Field | Bits | Size | Volatile? | Synopsis | Type |
| basic_enable | 0 | 1 | — | enable | RW |
| *116* | Operation || Enables or disables the WP channel.<br>Value — Description<br>0 — basic match disabled<br>1 — basic match enabled |||
| | When read || Returns current value |||
| | When written || Updates value |||
| | HARD reset || 0 |||
| asid_enable | 1 | 1 | — | ASID match enable | RW |
| *118* | Operation || Enables or disables the inclusion of the current ASID value in the debug event match.<br>Value — Description<br>0 — ASID match disabled<br>1 — ASID match enabled. Will only trigger when the current ASID matches the asid_value field. |||
| | When read || Returns current value |||
| | When written || Updates value |||
| | HARD reset || Undefined |||
| chain_enable | 2 | 1 | — | Chain-latch enable | RW |
| *120* | Operation || Enables or disables the inclusion of a specified chain-latch in the debug event match.<br>Value — Description<br>0 — Chain-latch match disabled<br>1 — Chain-latch match enabled. Will only trigger when the chain-latch specified by chain_id is set. |||
| | When read || Returns current value |||
| | When written || Updates value |||
| | HARD reset || Undefined |||
| chain_id | [3,6] | 4 | — | Chain-latch id | RW |
| *122* | Operation || Defines the chain-latch used in the debug event match. |||
| | When read || Returns current value |||
| | When written || Updates value |||
| | HARD reset || Undefined |||

*FIG. 5A*

| Field | Bits | Size | Volatile? | Synopsis | Type |
|---|---|---|---|---|---|
| ecount_enable | 7 | 1 | — | Event counter enable | RW |
| 124 | Operation | | Enables or disables the inclusion of a specified event counter in the debug event match.<br>Value — Description<br>0 — Event count match disabled<br>1 — Event count match enabled<br>Will only trigger when the event counted defined by ecount_id contains 0.<br>If the event matches in all respects other than the event counter containing zero, and if WPC.WP_*nx*_ACTION.action_ecount == 1, the event counter will be decremented whenever a basic match occurs. | | |
| | When read | | Returns current value | | |
| | When written | | Updates value | | |
| | HARD reset | | Undefined | | |
| ecount_id | [8,11] | 4 | — | Event counter id | RW |
| 126 | Operation | | Defines the event counter used in the debug event match. | | |
| | When read | | Returns current value | | |
| | When written | | Updates value | | |
| | HARD reset | | Undefined | | |
| asid_value | [12,19] | 8 | — | ASID match value | RW |
| 128 | Operation | | Defines the ASID value in the debug event match. | | |
| | When read | | Returns current value | | |
| | When written | | Updates value | | |
| | HARD reset | | Undefined | | |
| isamode_enable | [20,21] | 2 | — | CPU ISA mode selection | RW |
| 130 | Operation | | Allows the CPU ISA mode to be included in the debug event match.<br>This field is not implemented for the IV WP channels.<br>Value — Description<br>0b00, 0b11 — match irrespective of the current CPU ISA mode.<br>0b01 — only match if CPU is in Mode A (SH-32).<br>0b10 — only match if CPU is in Mode B (SH-16). | | |
| | When read | | Returns current value | | |
| | When written | | Updates value | | |
| | HARD reset | | Undefined | | |

FIG. 5B

| Field | Bits | Size | Volatile? | Synopsis | Type |
|---|---|---|---|---|---|
| smode_enable | [22,23] | 2 | — | CPU supervisor mode selection | RW |
| 132 | Operation | | Allows the CPU user/supervisor mode to be included in the debug event match. Value – Description 0b00, 0b11 –match irrespective of the current CPU user/supervisor mode. 0b01 –only match if CPU is in user mode. 0b10 –only match if CPU is in supervisor mode. | | |
| | When read | | Returns current value | | |
| | When written | | Updates value | | |
| | HARD reset | | Undefined | | |
| — | [24,63] | 40 | — | RESERVED | RES |
| | Operation | | RESERVED | | |
| | When read | | Returns 0 | | |
| | When written | | Ignored | | |
| | HARD reset | | 0 | | |

FIG. 5C

ACTION REGISTER DEFINITION

Note: WP=Watchpoint
WPchannel=Watchpoint Channel
WPC=Watchpoint Controller
DM=Debug Module

| Field | Bits | Size | Volatile? | Synopsis | Type |
|---|---|---|---|---|---|
| action_exception | 0 | 1 | — | Exception enable | RW |
| 134 | Operation | | | Enables or disables a debug exception for the WPC watchpoint channel.<br><br>Value — Description<br><br>0 — debug exception disabled<br>1 — debug exception enabled<br><br>Note: If debug exception is enabled, all other action fields are ignored when a watchpoint hit occurs. The debug exception will be the only action taken. | |
| | When read | | | Returns current value | |
| | When written | | | Updates value | |
| | HARD reset | | | Undefined | |
| action_ecount | 1 | 1 | — | Event count decrement enable | RW |
| 136 | Operation | | | Enables or disables decrement of an event counter for the WP channel. The event counter is specified by the ecount_id field of this register.<br><br>Value — Description<br><br>0 — event count decrement disabled<br>1 — if PARTIAL_WP_HIT, decrement enabled. No other action will occur unless the specified event counter contains 0. | |
| | When read | | | Returns current value | |
| | When written | | | Updates value | |
| | HARD reset | | | Undefined | |
| ecount_id | [2,5] | 4 | — | Event counter id | RW |
| 138 | Operation | | | Defines the event counter used in the debug event match. | |
| | When read | | | Returns current value | |
| | When written | | | Updates value | |
| | HARD reset | | | Undefined | |

FIG. 6A

| Field | Bits | Size | Volatile? | Synopsis | Type |
|---|---|---|---|---|---|
| chain_alter | [6,7] | 2 | — | Enable chain-latch alteration | RW |
| 140 | Operation | | Specifies if and how a chain latch is modified according to the match state. The chain latch is specified by the chain_id field<br><br>Value — Description<br><br>0b0x — do not alter the chain latch.<br><br>0b10 — if FULL_WP_HIT, clear the chain latch.<br><br>0b11 — if FULL_WP_HIT, set the chain latch. | | |
| | When read | | Returns current value | | |
| | When written | | Updates value | | |
| | HARD reset | | 0 | | |
| chain_id | [8,11] | 4 | — | Chain-latch id | RW |
| 142 | Operation | | Defines the chain-latch used in conjunction with chain_alter. | | |
| | When read | | Returns current value | | |
| | When written | | Updates value | | |
| | HARD reset | | Undefined | | |

FIG. 6B

| Field | Bits | Size | Volatile? | Synopsis | Type |
|---|---|---|---|---|---|
| action_trace | [12,13] | 2 | — | Trace enable | RW |
| *144* | Operation | | | Enables or disables generation of a trace message for the WP channel.<br><br>The trace information generated varies according to the WP channel.<br><br>Trace for the OA WP channels can be further controlled using the *DM*.WP_OAx_ACTION: oa_match field and the DM.OA_MATCH_* registers—<br><br>Trace is generated as shown below:<br>`if ( (FULL_WP_HIT && EXTRA_HIT) {`<br>`  if ( (action_trace == 0b11)||`<br>`      ((action_trace == 0b10) && !trace_`<br>`        match_state)) ){`<br>`    trace_match_state = 1`<br>`    GenerateTrace();`<br>`  }`<br>`} else {`<br>`    trace_match_state = 0;`<br>`}`<br><br><u>Value — Description</u><br><br>0b00 —trace generation disabled<br>0b01 —trace generation disabled<br>0b10 —trace generation enabled—<br>     single trace mode<br><br>Causes the generation of a single trace for multiple instructions all fetched from address range covered by an IA watchpoint. For all watchpoints other than IA, this mode produces the same effect as multi-trace mode.<br><br>0b11 —trace generation enabled—<br>     multi trace mode | |
| | When read | Returns current value | | | |
| | When written | Updates value | | | |
| | HARD reset | Undefined | | | |

*FIG. 6C*

| Field | Bits | Size | Volatile? | Synopsis | Type |
|---|---|---|---|---|---|
| trace_type<br><br>146 | 14 | 1 | — | Trace message type | RW |
| | Operation | | | Specifies the type of the trace message generated<br><br>Value — Description<br><br>0 — trigger trace message<br>1 — background trace message | |
| | When read | | | Returns current value | |
| | When written | | | Updates value | |
| | HARD reset | | | Undefined | |
| enable_trace_<br>timestamp<br><br>148 | 15 | 1 | — | Enable trace timestamp | RW |
| | Operation | | | Enable timestamp in trace message:<br><br>Value — Description<br><br>0 — no timestamp<br>1 — trace message includes timestamp value | |
| | When read | | | Returns current value | |
| | When written | | | Updates value | |
| | HARD reset | | | Undefined | |
| action_trig_out<br><br><br><br><br>150 | 16 | 1 | — | Trigger out enable | RW |
| | Operation | | | Enables or disables generation of a trigger out message for the WP channel. The effect of this on the dm_trout_n pin is determined by the programming of the DM.TRCTL register.<br><br>Value — Description<br><br>0 — The dm_trout_n is unaffected by hits on this WP channel.<br><br>1 — If DM.TRCTL.dm_trig_out_mode == 0b001, then a low going pulse is produced on the dm_trout_n pin each time a hit occurs on this WP channel<br><br>If DM.TRCTL.dm_trig_out_mode has any other value, hits on this WP channel have no effect on the dm_trout_n pin. | |
| | When read | | | Returns current value | |
| | When written | | | Updates value | |
| | HARD reset | | | Undefined | |

FIG. 6D

| Field | Bits | Size | Volatile? | Synopsis | Type |
|---|---|---|---|---|---|
| oa_match<br><br>152 | 17 | 1 | — | OA data match enable | RW |
| | Operation | | This field applies only to OA watchpoints. It determines whether DM chain latch and trace generation actions are dependent on a successful OA data match. The OA data match function must be enabled and DM.WP_OAx_ACTION.action_interrupt == 1 for debug interrupts to be generated.<br><br><u>Value</u> — <u>Description</u><br>0 —data match function is not enabled.<br>1 —data match function is enabled. | | | |
| | When read | | Returns current value | | | |
| | When written | | Updates value | | | |
| | HARD reset | | Undefined | | | |
| action_pcount<br><br>154 | 18 | 1 | — | Performance counter increment enable | RW |
| | Operation | | Enables or disables increment of a performance counter (specified by action_pcount_id) for the WP channel.<br><br><u>Value</u> — <u>Description</u><br>0 —performance count increment disabled<br>1 —performance count increment enabled | | | |
| | When read | | Returns current value | | | |
| | When written | | Updates value | | | |
| | HARD reset | | Undefined | | | |
| action_reset_<br>all_pcount<br><br>156 | 19 | 1 | — | Reset all performance counters | RW |
| | Operation | | Allows all the WPC performance counters to be reset when the WP channel triggers. The performance counters in the DM are not affected.<br><br><u>Value</u> — <u>Description</u><br>0— do not reset<br>1 —reset all performance counters | | | |
| | When read | | Returns current value | | | |
| | When written | | Updates value | | | |
| | HARD reset | | Undefined | | | |

*FIG. 6E*

| Field | Bits | Size | Volatile? | Synopsis | Type |
|---|---|---|---|---|---|
| action_pcount_id *158* | [20,23] | 4 | — | Performance counter id | RW |
| | Operation | | | Defines the WPC performance counter used in the counter increment. | |
| | When read | | | Returns current value | |
| | When written | | | Updates value | |
| | HARD reset | | | Undefined | |
| pl_module *160* | [24,31] | 8 | — | System Bus physical module number | RW |
| | Operation | | | This field only applies to System Bus analyzer watchpoints. Defines the identity of a physical System Bus master module (one of 256 possible masters) associated with the DM.WP_PLx_CTRL.src field for the purpose of freezing the bus master when a watchpoint hit occurs. The relationship between physical module number and System protocol source ID is specific to the chip implementation and known to the debug programmer. | |
| | When read | | | Returns current value | |
| | When written | | | Updates value | |
| | HARD reset | | | Undefined | |

*FIG. 6F*

| Field | Bits | Size | Volatile? | Synopsis | Type |
|---|---|---|---|---|---|
| freez_en | 32 | 1 | — | Freeze enable | RW |
| *162* | Operation | | This field only applies to System Bus analyzer watchpoints. It has no effect on WPC watchpoints Specifies whether the System Bus master specified by the pl_module field will be inhibited from generating further System Bus transactions. This "freeze" function should be enabled only when a specific source is defined. Value — Description 0 —No freeze action 1 —Freeze is enabled | | |
| | When read | | Returns current value | | |
| | When written | | Updates current value | | |
| | HARD reset | | 0 | | |
| — | [33,63] | 32 | — | RESERVED | RES |
| | Operation | | RESERVED | | |
| | When read | | Returns 0 | | |
| | When written | | Ignored | | |
| | HARD reset | | 0 | | |

*FIG. 6G*

MICROCOMPUTER DEBUG ARCHITECTURE AND METHOD

BACKGROUND OF THE INVENTION

1. Field of the Invention

The present invention relates generally to microcomputers. More particularly, the present invention relates to methods and apparatus for carrying out debugging operations on microcomputers.

2. Discussion of the Related Art

System-on-chip devices (SOCs), generally microcomputers, are well-known. These devices generally include a processor, one or more modules, bus interfaces, memory devices, and one or more system busses for communicating information. When designing, testing, and checking the microcomputer, it is necessary to operate the microcomputer in a mode so that problems with programs executing on the microcomputer can be identified and corrected. This process of problem identification and correction is known as "debugging". Because multiple modules and their communications occur internally to the chip, access to this information to this information is generally difficult when problems occur in software or hardware. Thus, debugging on these systems is not straightforward. As a result of development of these SOCs, specialized debugging systems have been developed to monitor performance and trace information on the chip. Such systems typically include dedicated hardware or software such as a debug tool and debug software which accesses a processor through serial communications.

However, debugging an SOC generally involves intrusively monitoring one or more processor registers or memory locations. Accesses to memory locations are sometimes destructive, and data access to a location being read from a debugging tool may impede processor performance. Similarly, accesses are generally performed over a system bus to the processor, memory, or other module, and may reduce available bandwidth over the system bus for performing general operations. Some debugging systems do not perform at the same clock speed as that of the processor, and it may be necessary to slow the performance of the processor to enable use of debugging features such as obtaining trace information. By slowing or pausing the processor, some types of error may not be reproduced, and thus cannot be detected or corrected. Further, accurate information may not be available altogether due to a high speed of the processor; information may be skewed or missing.

Some systems include one or more dedicated functional units within the SOC that are dedicated to debugging the processor, sometimes referred to as a debug unit or module. However, these units affect the operation of the processor when obtaining information such as trace information. These devices typically function at a lower speed than the processor, and thus affect processor operations when they access processor data. The debug system relies upon running debug code on the target processor itself, and this code is usually built into the debugee. Thus, the presence of the debug code is intrusive in terms of memory layout, and instruction stream disruption.

Other debugging systems referred to as in-circuit emulators (ICEs) match on-chip hardware and are connected to it. Thus, on-chip connections are mapped onto the emulator and are accessible on the emulator which is designed specifically for the chip to be tested. However, emulators are prohibitively expensive for some applications because they are specially-developed hardware, and do not successfully match all on-chip speeds or communications. Thus, emulator systems are inadequate. Further, these systems generally transfer information over the system bus, and therefore necessarily impact processor performance. These ICEs generally use a proprietary communication interface that can only interface with external debug equipment from the same manufacturer.

Another technique for troubleshooting includes using a Logic State analyzer (LSA) which is a device connected to pins of the integrated circuit that monitors the state of all off-chip communications. LSA devices are generally expensive devices, and do not allow access to pin information inside the chip.

Conventionally, there are two main types of development system architectures that may be used to debug a microcomputer. FIG. 1 illustrates a first type of debugging system. The system includes a target processor board 10. The target processor board 10 has a target processor 12 disposed thereon. Target processor 12 is the microcomputer that is being debugged by the debugging system. A monitor ROM 14 coupled to target processor 12 via data link 16 is also provided. A serial port interface 18 is provide to couple target processor 12 via data link 20 with host computer 22 via data link 24. Host computer 22 runs a software backplane/operating system 26 that allows a software debugger system 28 to access target processor 12. In the system illustrated in FIG. 1, the target processor 12 may have minimal or no debug features. Most of the tools necessary for debugging the operation of target processor 12 are contained in debugger software system 28.

The system of FIG. 1 is somewhat limited in the types of debugging operations that can be performed. Since a serial port is used to communicate between the target processor 12 and the host computer 22, the system is typically not capable of controlling the CPU directly to, for example, cause target processor 12 to boot from software executing on host computer 22. In addition, the debugging system of FIG. 1 can be intrusive since the system relies upon executing code on the target processor 12 itself. Thus, host computer 22 can and does actually disrupt the execution of code on target processor 12. Since the host computer 22 actually perturbs operation of target processor 12 during debugging operations, the results of the debugging operations may be subject to some uncertainty since the presence of the debugging system itself may alter the behavior of the target processor.

FIG. 2 illustrates another conventional debugging system. In the debugging system of FIG. 2, target processor 12 is connected to a debug adaptor 30 via a debug link 32. A host computer 22 runs a software backplane/operating system 26 that supports debugger system 28. Host computer 22 communicates with debug adapter 30 via bidirectional data link 34. Debug adapter 30 is "intelligent". It includes a CPU 36 and a random access memory 38 that execute adapter software to translate between the communication protocol of the debug link 34 and the communication protocol of the data link 34. Debug data link 34 may be, for example, an Ethernet connection or a PCI bus.

Optionally, external hardware such as a logic analyzer 40 may be provided that can supply a triggering signal to target processor 12 via trigger-in data link 42 and receive a trigger signal from target processor 12 via trigger-out data link 44.

The debug system of FIG. 2 does not require additional off-chip hardware, to interface the target processor to the debugging system, as is needed in the system of FIG. 1. This allows production target processors 12 to be debugged without requiring that they be combined with additional components prior to connection to the debugging system extra components. In addition, enhanced debugging features can be provided because of the inclusion of debug adaptor 30 in the system. However, the debugging system of FIG. 2 still suffers from at least the limitation of being intrusive in that the debugging software may still perturb operation of target processor 12.

SUMMARY OF THE INVENTION

According to one aspect of the invention, there is provided a computer system comprising at least one central processing unit, a memory unit coupled to the at least one central processing unit, a set of watchpoints defined in the computer system, each watchpoint in the set of watchpoints comprising a programmable precondition register that stores a set of precondition codes, wherein the set of precondition codes is identical for each watchpoint in the set of watchpoints, a programmable action register that stores a set of action codes, wherein the set of action codes is identical for each watchpoint in the set of watchpoints, and a first comparator, having inputs coupled to the precondition register, that compares at least one precondition code in the set of precondition codes with a first data value in the computer system and provides a signal to the action register in response thereto.

According to another aspect of the invention, the comparator provides the signal to the action register if the first data value in the computer system satisfies the precondition code.

According to another aspect of the invention, the computer system responds to the signal provided to the action register and generates a signal, determined by the action code, indicating that the watchpoint has been triggered.

According to another aspect of the invention the computer system includes hardware and software that selects which precondition codes in the set of precondition codes are active for a particular watchpoint in the set of watchpoints.

According to another aspect of the invention, the computer system includes hardware and software that selects which action codes in the set of action codes are active for a particular watchpoint in the set of watchpoints.

According to another aspect of the invention, the set of watchpoints includes types of watchpoints for operand addresses, instruction values, instruction addresses, branches, breakpoint instructions, and printf instructions.

According to another aspect of the invention, each watchpoint further comprises a programmable match register that stores at least one match code, wherein the match code stored depends on the type of watchpoint.

According to another aspect of the invention, the computer system further comprises a second comparator, having inputs coupled to the first comparator, that responds to the first comparator, and compares the at least one match code with a second data value in the computer system and provides the signal to the action register in response thereto.

According to another aspect of the invention, the match code includes at least one of an address range, a data value, a data mask, an instruction value, an instruction mask, a branch type, and a signal external to the at least one central processing unit.

According to another aspect of the invention, the second comparator provides the signal to the action register if the second data value in the computer system matches the match code.

According to another aspect of the invention, the set of precondition codes includes a basic enable code, an address space identifier enable code, an address space identifier code, a latch enable code, a latch identifier code, an event counter enable code, an event counter identifier code, an Instruction Set Architecture (ISA) mode enable code, and a CPU supervisor mode selection code.

According to another aspect of the invention, the set of action codes includes an exception enable code, an event count decrement enable code, an event counter identifier code, a latch alter code, a latch identifier code, a performance counter increment enable code, a reset all performance counters code, a performance counter identifier code, a trace enable code, a trace message type code, an enable trace time stamp code, a trigger out enable code, and an interrupt enable code.

According to another aspect of the invention, the computer system is implemented on a single integrated circuit chip.

According to another aspect of the invention, each watchpoint comprises a programmable match register that stores at least one match code, wherein the match code stored depends on the type of watchpoint and wherein the precondition register, the match register, and the action register occupy respective memory locations in the memory unit.

According to another aspect of the invention, there is provided a computer system comprising at least one central processing unit, a memory unit coupled to the at least one central processing unit, a set of watchpoints defined in the computer system, each watchpoint in the set of watchpoints comprising a first programmable storage means for storing at least one precondition code that is identical for each watchpoint in the set of watchpoints, a second programmable storage means for storing at least one action code that is identical for each watchpoint in the set of watchpoints, and a comparator, having inputs responsive to the first programmable storage means, that compares the at least one precondition code with a data value in the computer system and provides a signal to the second programmable storage means in response thereto.

According to another aspect of the invention, there is provided a method of triggering a watchpoint in a computer system comprising at least one central processing unit and a memory unit coupled to the at least one central processing unit, the method comprising the steps of defining a set of watchpoints in the computer system by defining a set of precondition registers and a set of action registers, storing a set of precondition codes in a precondition register, wherein the set of precondition codes is identical for each watchpoint in the set of watchpoints, storing a set of action codes in an action register, wherein the set of action codes is identical for each watchpoint in the set of watchpoints, comparing at least one precondition code in the set of precondition codes with a first data value in the computer system and providing a signal to the action register in response thereto.

According to another aspect of the invention, the step of comparing includes the step of providing the signal to the action register if the first data value in the computer system satisfies the precondition code.

According to another aspect of the invention, the method comprises the step of selecting which precondition codes in the set of precondition codes are active for a particular watchpoint in the set of watchpoints.

According to another aspect of the invention, the method comprises the step of selecting which action codes in the set of action codes are active for a particular watchpoint in the set of watchpoints.

According to another aspect of the invention the set of watchpoints includes types of watchpoints for operand addresses, instruction values, instruction addresses, branches, breakpoint instructions, and printf instructions.

According to another aspect of the invention, the method comprises the step of defining a programmable match register and storing an at least one match code in the match register, wherein the match code depends on the type of watchpoint.

According to another aspect of the invention, the method comprises the step of comparing, after the at least one precondition code has been satisfied, the at least one match code with a second data value in the computer system.

According to another aspect of the invention, the signal is provided to the action register if the second data value matches the match code.

According to another aspect of the invention, the set of precondition codes includes a basic enable code, an address space identifier enable code, an address space identifier code, a latch enable code, a latch identifier code, an event counter enable code, an event counter identifier code, an Instruction Set Architecture (ISA) mode enable code, and a CPU supervisor mode selection code.

According to another aspect of the invention, the computer system comprises a set of action codes including an exception enable code, an event count decrement enable code, an event counter identifier code, a latch alter code, a latch identifier code, a performance counter increment enable code, a reset all performance counters code, a performance counter identifier code, a trace enable code, a trace message type code, an enable trace time stamp code, a trigger out enable code, and an interrupt enable code.

According to another aspect of the invention, the computer system further comprises the step of defining the precondition register, the match register, and the action register in respective memory locations in the memory unit.

According to another aspect of the invention there is provided a method of filtering debugging data in a computer system comprising at least one central processing unit and a memory unit coupled to the at least one central processing unit, the method comprising the steps of defining a set of watchpoints in the computer system by defining a set of precondition registers and a set of action registers, defining a set of identical precondition codes to be applied to each watchpoint in the set of watchpoints, defining a set of identical action codes to be applied to each watchpoint in the set of watchpoints, storing the set of precondition codes in each precondition register in the set of precondition registers, storing the set of action codes in each action register in the set of action registers, selecting which precondition codes in the set of precondition codes are to be active for a particular watchpoint, selecting which action code in the set of action codes are to be active for a particular watchpoint, operating the computer system so as to execute a program, comparing the debugging data in the computer system with the active precondition codes for a particular watchpoint, sending a signal to the action register for the particular watchpoint when the debugging data in the computer system satisfies the active precondition codes for the particular watchpoint, and causing the computer to respond to the active action codes for the particular watchpoint.

According to another aspect of the invention, the set of watchpoints includes types of watchpoints for operand addresses, instruction values, instruction addresses, branches, breakpoint instructions, and printf instructions.

According to another aspect of the invention, the set of precondition codes includes a basic enable code, an address space identifier enable code, an address space identifier code, a latch enable code, a latch identifier code, an event counter enable code, an even counter identifier code, an Instruction Set Architecture (ISA) mode enable code, and a CPU supervisor mode selection code.

According to another aspect of the invention, the set of action codes includes an exception enable code, an event count decrement enable code, an event counter identifier code, a latch alter code, a latch identifier code, a performance counter increment enable code, a reset all performance counters code, a performance counter identifier code, a trace enable code, a trace message type code, an enable trace time stamp code, a trigger out enable code, and an interrupt enable code.

According to another aspect of the invention, the method comprises the step of defining a programmable match register and storing an at least one match code in the match register, wherein the match code depends on the type of watchpoint.

According to another aspect of the invention, the method comprises the step of comparing, after the at least one precondition code has been satisfied, the at least one match code with a second data value in the computer system.

According to another aspect of the invention, the signal is provided to the action register if the second data value matches the match code.

According to another aspect of the invention, the match code includes at least one of an address range, a data value, a data mask, an instruction value, and instruction mask, a branch type, and a signal external to the at least one central processing unit.

According to another aspect of the present invention, the method comprises the step of defining the precondition register, the match register, and the action register in respective memory locations in the memory unit.

According to another aspect of the invention, there is provided a computer system comprising at least one central processing unit, a memory unit coupled to the at least one central processing unit, a set of watchpoints defined in the computer system, each watchpoint in the set of watchpoints comprising a programmable precondition register and a programmable action register, a set of latches, and selection circuitry that selects one latch in the set of latches to couple an output of an action register to an input of the selected latch.

According to another aspect of the invention, the selection circuitry comprises a demultiplexer having an input coupled to the output of the action register and a plurality of outputs each respectively coupled to an input of each latch in the set of latches.

According to another aspect of the invention, the selection circuitry comprises a multiplexer having a plurality of inputs each respectively coupled to an output of each latch in the set of latches and an input coupled to a precondition register.

According to another aspect of the invention, the computer system further comprises a set of demultiplexers corresponding to the set of watchpoints, each demultiplexer in the set of demultiplexers having an input respectively coupled to an output of a respective action register in the set of watchpoints, each demultiplexer in the set of demultiplexers having a plurality of outputs respectively coupled to an input of each latch in the set of latches.

According to another aspect of the invention, the computer system further comprises a set of multiplexers corresponding to the set of watchpoints, each multiplexer in the set of multiplexers having a plurality of inputs respectively coupled to an output of each latch in the set of latches, each multiplexer in the set of multiplexers having an output coupled to an input of a respective precondition register in the set of watchpoints.

According to another aspect of the invention, the computer system further comprises a control register respectively associated with a latch in the set of latches, the control register having a state, responsive to a signal external to the computer system, that sets or resets the latch.

According to another aspect of the invention, the computer system is implemented on a single integrated circuit chip.

According to another aspect of the invention, the demultiplexer includes a select output, responsive to a state of the action register, that controls the demultiplexer to select an input of one latch in the set of latches.

According to another aspect of the invention, the multiplexer includes a select input, responsive to a state of the precondition register, that controls the multiplexer to select an output of one latch in the set of latches.

According to another aspect of the invention, each multiplexer has a select input, responsive to a state of a respective precondition register, that controls each multiplexer to select an output of one latch in the set of latches.

According to another aspect of the invention, each demultiplexer has a select output, responsive to a state of a respective action register, that controls the demultiplexer to select an input of one latch in the set of latches.

According to another aspect of the invention, the precondition register stores a set of precondition codes, wherein the set of precondition codes is identical for each watchpoint in the set of watchpoints.

According to another aspect of the invention, the action register stores a set of action codes, wherein the set of action codes is identical for each watchpoint in the set of watchpoints.

According to another aspect of the invention, the computer system includes hardware and software that selects which precondition codes in the set of precondition codes are active for a particular watchpoint in the set of watchpoints.

According to another aspect of the invention, the computer system includes hardware and software that selects which action codes in the set of action codes are active for a particular watchpoint in the set of watchpoints.

According to another aspect of the invention, the set of watchpoints includes types of watchpoints for operand addresses, instruction values, instruction addresses, branches, breakpoint instructions, and printf instructions.

According to another aspect of the invention, each watchpoint further comprises a programmable match register that stores at least one match code, wherein the match code stored depends on the type of watchpoint.

According to another aspect of the invention, the match code includes at least one of an address range, a data value, a data mask, an instruction value, an instruction mask, and a branch type.

According to another aspect of the invention, the set of precondition codes includes a basic enable code, an address space identifier enable code, an address space identifier code, a latch enable code, a latch identifier code, an event counter enable code, an even counter identifier code, an Instruction Set Architecture (ISA) mode enable code, and a CPU supervisor mode selection code.

According to another aspect of the invention, the set of action codes includes an exception enable code, an event count decrement enable code, an event counter identifier code, a latch alter code, a latch identifier code, a performance counter increment enable code, a reset all performance counters code, a performance counter identifier code, a trace enable code, a trace message type code, an enable trace time stamp code, a trigger out enable code, and an interrupt enable code.

According to another aspect of the invention there is provided a computer system, comprising, at least one central processing unit, a memory unit coupled to the at least one central processing unit, a set of watchpoints defined in the computer system, and means for linking one watchpoint in the set of watchpoints with at least one other watchpoint in the set of watchpoints, wherein the means for linking is programmable.

According to another aspect of the invention, the means for linking includes, associated with each watchpoint, a programmable precondition register that stores a set of precondition codes, wherein the set of precondition codes is identical for each watchpoint in the set of watchpoints and a programmable action register that stores a set of action codes, wherein the set of action codes is identical for each watchpoint in the set of watchpoints.

According to another aspect of the invention, the means for linking further comprises a latch.

According to another aspect of the invention, the latch is coupled between an output of an action register associated with one watchpoint in the set of watchpoints and an input of every input of every other precondition register in the set of watchpoints.

According to another aspect of the invention, there is provided a method of operating a computer system comprising at least one central processing unit and a memory unit coupled to the at least one central processing unit, the method comprising the steps of defining a set of watchpoints in the computer system by defining a set of precondition registers and a set of action registers, defining a set of identical precondition codes to be applied to each watchpoint in the set of watchpoints, defining a set of identical action codes to be applied to each watchpoint in the set of watchpoints, storing the set of precondition codes in each precondition register in the set of precondition registers, storing the set of action codes in each action register in the set of action registers, selecting which precondition codes in the set of precondition codes are to be active for a particular watchpoint, selecting which action code in the set of action codes are to be active for a particular watchpoint, operating the computer system so as to execute a program, comparing the debugging data in the computer system with the active precondition codes for a particular watchpoint, sending a signal to the action register for the particular watchpoint when the debugging data in the computer system satisfies the active precondition codes for the particular watchpoint, and wherein the computer system responds to the active action code by generating a trigger signal and the computer system further responds to the trigger signal by setting or clearing a latch in response to a state of the trigger signal.

According to another aspect of the invention, the computer system comprises a set of latches and the method further comprises the step of selecting a latch in the set of latches to respond to the trigger signal.

According to another aspect of the invention, the method further comprises the step of providing an output signal from the latch to each precondition register in the set of watchpoints.

According to another aspect of the invention, the method further comprises the step of selecting a precondition register to respond to the output signal from the latch.

According to another aspect of the invention, the set of watchpoints includes types of watchpoints for operand addresses, instruction values, instruction addresses, branches, breakpoint instructions, and printf instructions.

According to another aspect of the invention, the set of precondition codes includes a basic enable code, an address space identifier enable code, an address space identifier code, a latch enable code, a latch identifier code, an event counter enable code, an even counter identifier code, an ISA mode enable code, and a CPU supervisor mode selection code.

According to another aspect of the invention, the set of action codes includes an exception enable code, an event count decrement enable code, an event counter identifier code, a latch alter code, a latch identifier code, a performance counter increment enable code, a reset all performance counters code, a performance counter identifier code, a trace enable code, a trace message type code, an enable trace time stamp code, a trigger out enable code, and an interrupt enable code.

According to another aspect of the invention, the method comprises the step of defining a programmable match register and storing at least one match code in the match register, wherein the match code depends on the type of watchpoint.

According to another aspect of the invention, the method further comprises the step of comparing, after the at least one precondition code has been satisfied, the at least one match code with a second data value in the computer system.

According to another aspect of the invention, the signal is provided to the action register if the second data value matches the match code.

According to another aspect of the invention, the method further comprises the step of defining the precondition register, the match register, and the action register in respective memory locations in the memory unit.

According to another aspect of the invention, there is provided a computer system comprising at least one central processing unit, a memory unit coupled to the at least one central processing unit, a set of watchpoints defined in the computer system, each watchpoint in the set of watchpoints comprising a programmable precondition register that stores a set of precondition codes, wherein the set of precondition codes is identical for each watchpoint in the set of watchpoints, a programmable action register that stores a set of action codes, wherein the set of action codes is identical for each watchpoint in the set of watchpoints, a set of latches, each latch having an input and an output, and circuitry that couples at least one latch in the set of latches to at least two watchpoints in the set of watchpoints so that there is a predetermined relationship between triggering of the at least two watchpoints.

According to another aspect of the invention, the predetermined relationship is defined by which precondition codes in the set of precondition codes are active and by which action codes in the set of action codes are active.

According to another aspect of the invention, the predetermined relationship is an AND function.

According to another aspect of the invention, the predetermined relationship is an OR function.

According to another aspect of the invention, a first one of the at least two watchpoints is triggered when the first watchpoint is triggered and when a second one of the at least two watchpoints is also triggered.

According to another aspect of the invention, an action register of a first watchpoint is coupled to a set input of the latch and an action register of a second watchpoint is coupled to a reset input of the latch and further comprising a third watchpoint having a precondition register coupled to an output of the latch so that triggering of the first watchpoint sets the latch to enable the third watchpoint and triggering of the second watchpoint resets the latch to disable the third watchpoint.

According to another aspect of the invention, an action register of a first watchpoint is coupled to a set input of the latch and an action register of a second watchpoint is coupled to a reset input of the latch and a precondition register of the second watchpoint is coupled to an output of the latch so that triggering of the first watchpoint sets the latch to enable the second watchpoint and triggering of the second watchpoint resets the latch to disable the second watchpoint.

According to another aspect of the invention, a respective action register for first number of watchpoints in the set of watchpoints is coupled to a set input of the latch and a respective action register of a second number of watchpoints in the set of watchpoints is coupled to a reset input of the latch and further comprising another watchpoint having a precondition register coupled to an output of the latch so that triggering of any of the first number of watchpoints sets the latch to enable the another watchpoint and triggering of any of the second number of watchpoints resets the latch to disable the third watchpoint.

According to another aspect of the invention, there is provided a method of filtering debugging data in a computer system comprising at least one central processing unit and a memory unit coupled to the at least one central processing unit, the method comprising the steps of defining a set of at least three watchpoints in the computer system by defining a set of precondition registers and a set of action registers for each watchpoint, defining a set of identical precondition codes to be applied to each watchpoint in the set of watchpoints, defining a set of identical action codes to be applied to each watchpoint in the set of watchpoints, storing the set of precondition codes in each precondition register in the set of precondition registers, storing the set of action codes in each action register in the set of action registers, selecting which precondition codes in the set of precondition codes are to be active for each of the at least three watchpoints, selecting which action codes in the set of action codes are to be active for each of the at least three watchpoints so that the first and second watchpoints activate a precondition code in the precondition register of the third watchpoint, operating the computer system so as to execute a program, comparing the debugging data in the computer system with the active precondition codes for each of the at least three watchpoints, and triggering one of the first and second watchpoints when the debugging data in the computer system satisfies the active precondition codes for the first or second watchpoints and triggering the third watchpoint in response to triggering of one of the first and second watchpoints.

According to another aspect of the invention, the set of watchpoints includes types of watchpoints for operand addresses, instruction values, instruction addresses, branches, breakpoint instructions, and printf instructions.

According to another aspect of the invention, the set of precondition codes includes a basic enable code, an address space identifier enable code, an address space identifier code, a latch enable code, a latch identifier code, an event counter enable code, an event counter identifier code, an ISA mode enable code, and a CPU supervisor mode selection code.

According to another aspect of the invention, the set of action codes includes an exception enable code, an event count decrement enable code, an event counter identifier code, a latch alter code, a latch identifier code, a performance counter increment enable code, a reset all performance counters code, a performance counter identifier code, a trace enable code, a trace message type code, an enable trace time stamp code, a trigger out enable code, and an interrupt enable code.

According to another aspect of the invention, the method comprises the step of defining a programmable match register and storing an at least one match code in the match register, wherein the match code depends on the type of watchpoint.

According to another aspect of the invention, the method further comprises the step of comparing, after the at least one precondition code has been satisfied, the at least one match code with a second data value in the computer system.

According to another aspect of the invention, the signal is provided to the action register if the second data value matches the match code.

According to another aspect of the invention, the method further comprises the step of defining the precondition register, the match register, and the action register in respective memory locations in the memory unit.

BRIEF DESCRIPTION OF THE DRAWINGS

In the drawings, which are incorporated herein by reference and in which like elements have been given like reference characters.

FIGS. 5A–5C illustrate the definition of the precondition register illustrated in FIG. 4;

FIGS. 6A–6G illustrate the definition of the action register illustrated in FIG. 4;

DETAILED DESCRIPTION

Although the invention will be explained with reference to its use in a single chip microcomputer, the invention can also be used in computer systems composed of several chips.

Figure 1:
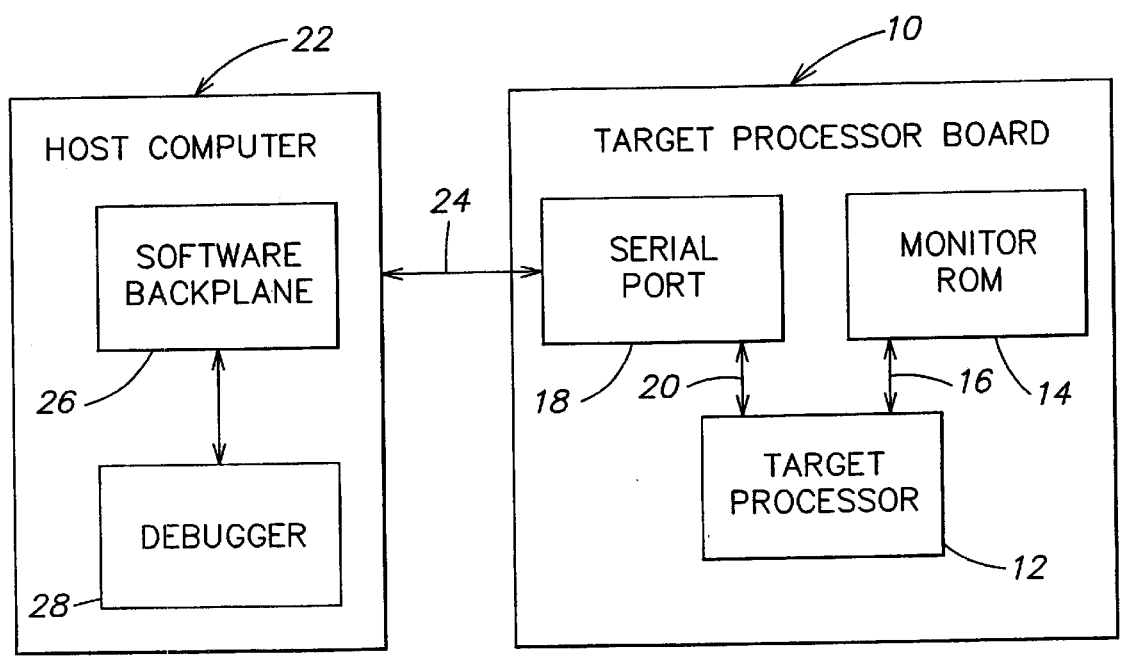
FIG. 1 illustrates a first microcomputer debugging system.
Figure 2:
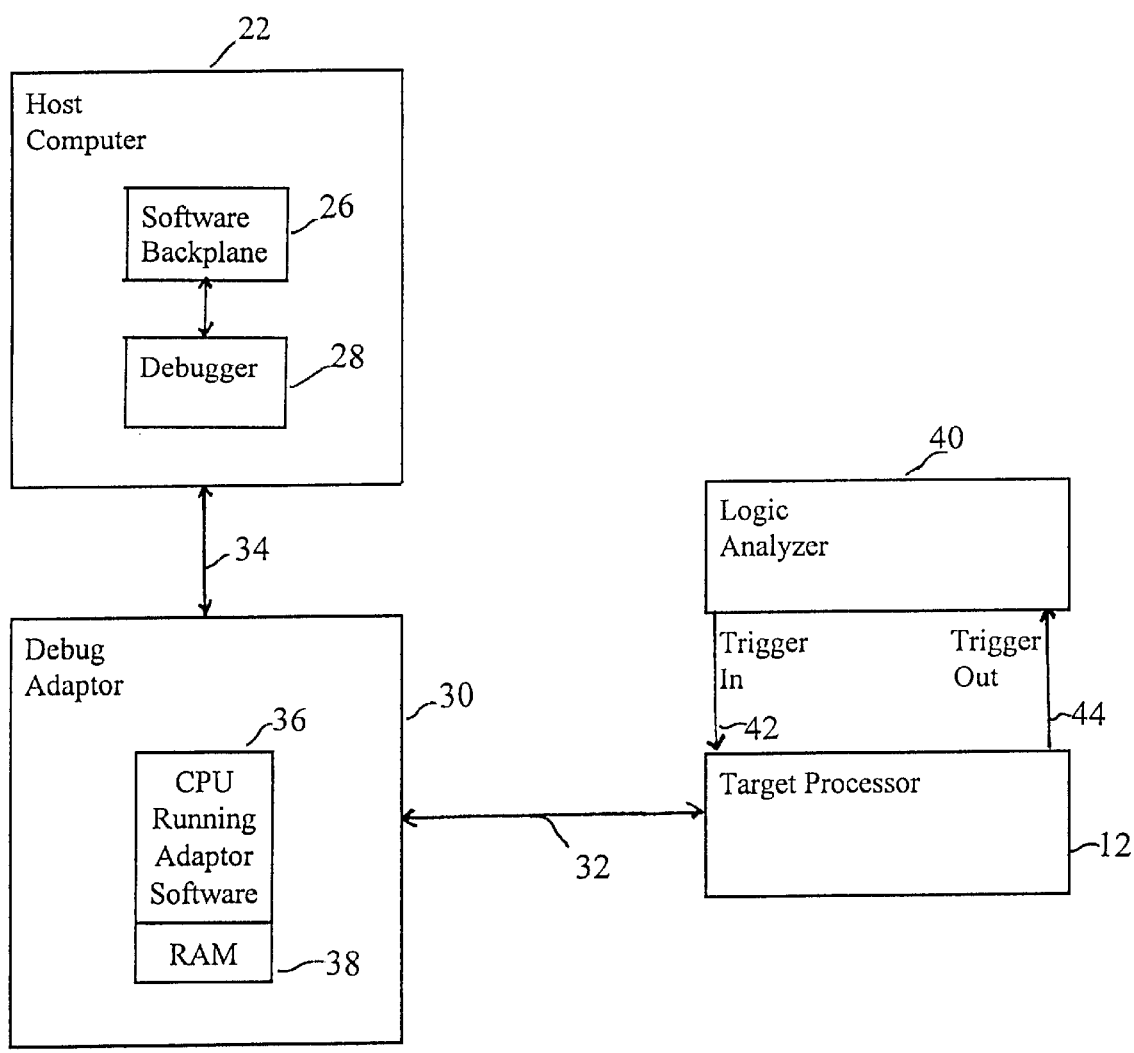
FIG. 2 illustrates another microcomputer debugging system.
Figure 3:
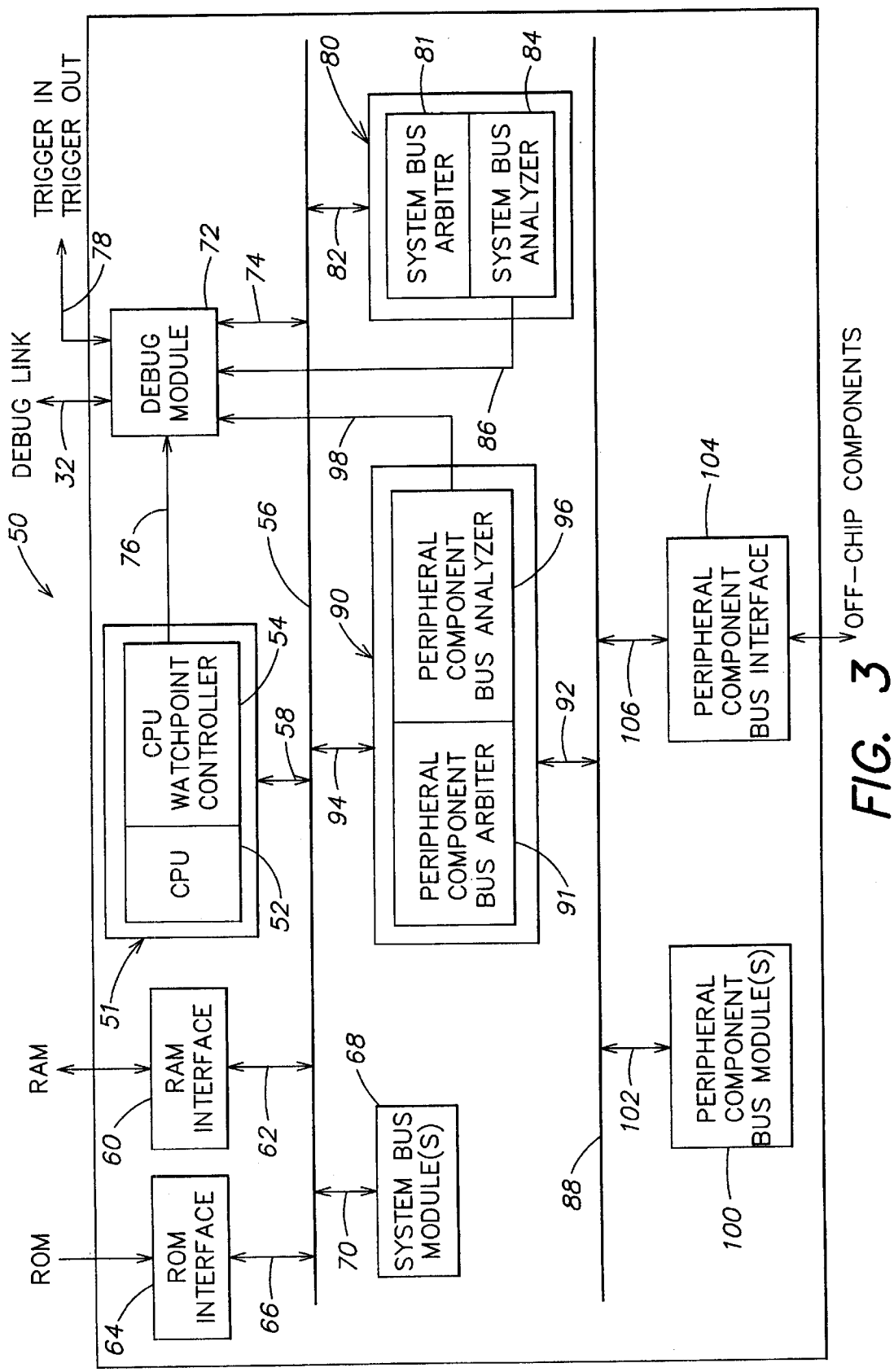
FIG. 3 illustrates an overall computer system structure in accordance with the invention.

FIG. 3 illustrates a single chip microcomputer 50 according to the invention. Microcomputer 50 may be used in either of the microcomputer debugging systems of FIG. 1 or 2. Microcomputer 50 includes a central processing unit core 51 for executing operations within the computer. A central processing unit (CPU) 52 and a CPU watchpoint controller 54, are provided as part of the CPU core 51. Although a single central processing unit core 51 is illustrated in FIG. 3, microcomputer 50 could include multiple central processing units 52. As will be explained in more detail hereinafter, CPU watchpoint controller 54 contains watchpoint control circuitry for triggering CPU watchpoints and reporting this information to other parts of microcomputer 50. CPU core 51 is coupled to a system bus 56 via a data link 58. System bus 56 provides a pathway for the exchange of data, instructions, and control signals between the modules and interfaces attached to the system bus. A RAM interface 60 that provides an interface to off-chip random access memory is coupled to system bus 56 via data link 62. A ROM interface 64 that provides access to off-chip read only memory is coupled to system bus 56 via data link 66. Other system bus modules 68 are coupled to system bus 66 by data link 70.

A debug module 72 containing a debug interface is coupled to system bus 56 via data link 74. Debug module 72 receives debugging data from CPU core 51 via data link 76. Debug module 72 provides an off-chip interface via debug link 32 that allows microcomputer 50 to interface to, for example, debug adaptor 30. Debug module 72 also provides a trigger in/trigger out interface 78. Trigger in/trigger out interface 78 allows debug module 72 to send debug information such as the triggering of watchpoints, off chip via a trigger out signal path to external hardware such as a logic analyzer in order to trigger the logic analyzer in other debugging operations. Trigger in/trigger out interface 78 also provides a trigger in signal path which allows external devices, such as logic analyzers, to provide a trigger signal to microcomputer 50 for use in triggering on-chip debugging hardware. Trigger in/trigger out interface 78 may also be used to couple microcomputer 50 to other CPU cores or even other microcomputers. This allows debugging data from the other CPU cores or microcomputers to be used by microcomputer 50 as part of its debugging process. This also allows microcomputer 50 to transmit debugging data to other CPU cores or microcomputers to trigger watchpoints or other debug operations in these other devices.

Microcomputer 50 also includes a system bus controller 80 coupled to system bus 56 via data link 82. System bus controller 80 contains a system bus arbiter 81 that controls the flow of data traffic over system bus 56. A system bus analyzer 84 contains watchpoint control circuitry for triggering system bus watchpoints is disposed in system bus controller 80. The operation of the watchpoint circuitry within system bus analyzer 84 will be explained in more detail hereinafter. System bus analyzer 84 sends debugging information, such as the triggering of the system bus watchpoints via data link 86 to debug module 72.

Microcomputer 50 also includes a peripheral component bus 88. A peripheral component bus controller 90 contains a peripheral component bus arbiter 91 that controls data flow over the peripheral component bus 88, is coupled to peripheral component bus 88 via data link 92 and provides an interface to system bus 56 via data link 94. Peripheral component bus controller 90 includes a peripheral component bus analyzer 96 that contains control circuitry for triggering peripheral component bus watchpoints. Peripheral component bus analyzer 96 provides debugging data, such as the triggering of watchpoints, to debug module 72 via data link 98.

Peripheral component bus modules 100 can be coupled to peripheral component bus 88 via data link 102. A peripheral component bus interface 104, coupled to peripheral component bus 88 via data link 106 provides an interface for off-chip components to peripheral component bus 88.

A feature of the present invention is to provide a set of "watchpoints" in microcomputer 50. A watchpoint is a mechanism for monitoring a state of execution of microcomputer 50 and providing a signal when a number of conditions within microcomputer 50 have been met. When the conditions necessary for activating a watchpoint have been met, the watchpoint is said to be "triggered". Watchpoints are used when debugging programs executing on microcomputer 50 as well to identify faults in the circuitry of microcomputer 50 itself. Watchpoints may be used to raise exceptions, generate trace messages, and generally provide debugging data to a user. A number of watchpoints may be provided in microcomputer 50. As noted in connection with FIG. 3, watchpoints may be provided for the CPU, the system bus, the peripheral component bus, and the debug module. One skilled in the art will appreciate that although these four types of watchpoints have been specifically mentioned, other watchpoints may be provided in other portions of microcomputer 50.

Figure 4:
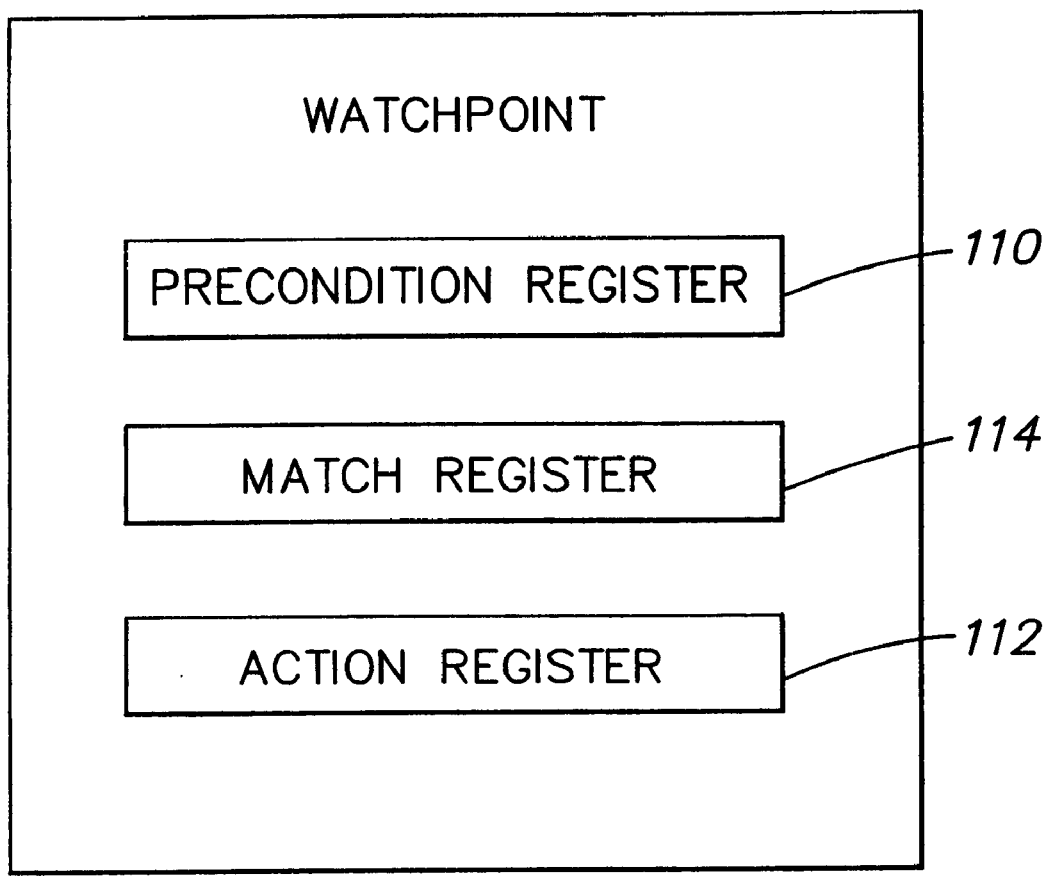
FIG. 4 illustrates a watchpoint structure according to the invention.

FIG. 4 illustrates a watchpoint specification according to the invention. A watchpoint according to the invention is defined by two memory mapped registers 110 and 112. Register 110 is a precondition register that stores a set of precondition codes. The precondition codes define particular states of microcomputer 50 that must be met before a watchpoint is enabled, that is, before the watchpoint can be triggered. A feature of the invention is that all the precondition registers in the set of watchpoints for microcomputer 50 share that same set of preconditions. That is, the set of preconditions for all watchpoints is identical whether the watchpoint is a CPU watchpoint, a debug module watchpoint, a system bus analyzer watchpoint, or any other type of watchpoint.

Action register 112 defines a set of actions that microcomputer 50 may take if the watchpoint has been triggered as a result of satisfaction of all of the active precondition codes in precondition register 110. As with the preconditions, the set of actions specified by action register 112 is identical for all watchpoints defined within microcomputer 50.

Watchpoints may be provided for operand addresses, instruction values, instruction addresses, branches, breakpoint instructions, and printf instructions, for example.

As noted previously, precondition register 110 and action register 112 are memory mapped registers and are programmable. Precondition register 110 and action register 112 may be programmed when a debugging mode of microcomputer 50 is operating. Since precondition register 110 and action register 112 are memory mapped into the main memory of microcomputer 50, these registers can be read and programmed by devices external to microcomputer 50, such as the debugger system 28 illustrated in FIGS. 1 and 2. One skilled in the art will appreciate that although a uniform on identical set of preconditions is provided for each watchpoint, not all preconditions need to be satisfied for every watchpoint in microcomputer 50. Since the precondition and action registers are programmable, triggering of a particular watchpoint will depend on which preconditions in precondition register 110 area active for the particular watchpoint. The selection of which preconditions are to be active for a particular watchpoint is determined when microcomputer 50 is in a debugging mode and particular fields of precondition register 110 are enabled.

In the same manner, although a uniform or identical set of actions is provided for each watchpoint, the actions that are taken by microcomputer 50 in response to triggering of a watchpoint will depend on which actions in action register 112 are active for the particular watchpoint. Not all actions in the set of actions need to be taken upon triggering of a watchpoint. The selection of which actions are to be active for a particular watchpoint is determined when microcomputer 50 is in a debugging mode and particular fields of register 112 are enabled.

A precondition register and an action register are provided for each watchpoint defined in microcomputer 50. Since the set of preconditions and actions for each watchpoint in the set of watchpoints defined in microcomputer 50 is the same, the watchpoint definition according to the invention allows all watchpoints in microcomputer 50 to be programmed in a uniform manner. Thus, no special steps need be taken for particular types of watchpoints, which simplifies programming and debugging of microcomputer 50. In addition, since the precondition registers and action registers are programmable, a large degree of flexibility is provide in determining when a watchpoint will be enabled and what action microcomputer 50 will take upon triggering of the watchpoint.

Optionally, a memory mapped match register 114 may also be provided as part of the definition of a watchpoint. Match register 114 includes specific data values that must be identically matched before a watchpoint may be triggered. The match conditions stored in match register 114 are specific to a particular type of watchpoint. For example, an instruction address watchpoint may include an address range which would be specified in match register 114. An operand address watchpoint may include an address range and a data value/mask which would be specified in match register 114. An instruction value watchpoint may include an instruction value and an instruction mask that would be specified in match register 114. A branch watchpoint may include a branch type that would be specified in match register 114. Thus, match register 114 may provide additional conditions that need to be matched before a watchpoint is triggered, but these conditions are specific to the particular type of watchpoint.

FIGS. 5A–5C illustrates one embodiment of a precondition register 110 that defines a number of preconditions for a watchpoint. As noted previously, the definition of precondition register 110 is the same for each watchpoint in the set of watchpoints. In one embodiment of the invention, precondition register 110 illustrated in FIGS. 5A–5C is a 64 bit memory-mapped register, however one skilled in the art will appreciate that precondition register 110 could be of any number of bits.

A first field 116 of precondition register 110 is a one bit basic enable field that enables or disables the watchpoint. A second field 118 is a one bit address space identifier enable field that enables or disables the inclusion of the current ASID value in triggering of the watchpoint. A third field 120 is a one bit chain latch enable field that specifies whether or not a particular chain latch will be included in triggering of the watchpoint. Chain latches will be discussed in more detail hereinafter. A fourth field 122 is a four bit chain latch identification field that is used to define which chain latch in the set of chain latches is to be used in triggering the watchpoint. A fifth field 124 is a one bit event count enable field that determines if a specified event counter will be part of the triggering of the watchpoint. A sixth field 126 is a four bit event counter identification field that defines which event counter in microcomputer 50 will be used in triggering the watchpoint. A seventh field 128 is an eight bit ASID value field that defines the ASID value that will be used in triggering the watchpoint. An eighth field 130 is a two bit CPU ISA mode selection field that specifies which CPU mode is to be used in determining the triggering of the watchpoint. A ninth field 132 is a two bit supervisor mode selection field that specifies whether the CPU user mode or supervisor mode is to be included the triggering of the watchpoint. The remaining bits of precondition register 110 are reserved. More detailed information concerning the fields in precondition register 112 is depicted in the description of each field in FIGS. 5A–5C.

One skilled in the art will appreciate that although FIGS. 5A–5C illustrate one example of the definition of precondition register 110, other conditions could be specified depending on the particular microcomputer being debugged and the particular conditions regarded as significant to the debugging procedure. Furthermore, one skilled in the art will appreciate that not all of the conditions specified in FIGS. 5A–5C need to be provided. For example, a set of preconditions could be defined for a particular microcomputer that have fewer preconditions or different preconditions from those illustrated in FIGS. 5A–5C. Any set of preconditions could be defined as long as that set of preconditions is uniform for all watchpoints defined in the microcomputer.

Reference is now made to FIGS. 6A–6G, which figures illustrate one embodiment of an action register 112 that defines a number of actions that may be taken by microcomputer 50 when a watchpoint is triggered. In one embodiment, action register 112 illustrated in FIGS. 6A–6G is a 64 bit memory-mapped register, however, one skilled in the art will appreciate that action register 112 could be any number of bits.

A first one bit field 134 specifies an exception enable field that microcomputer 50 will respond to by raising a debug exception. A second one bit field 136 is an event count decrement enable field that microcomputer 50 will respond to by enabling or disabling decrementing an event counter. A third four bit field 138 is an event counter identification field that defines the event counter that microcomputer 50 will act on when the watchpoint is triggered. A fourth two bit field 40 is an enable chain latch alteration field that specifies if and how a chain latch is modified by microcomputer 50 when a watchpoint is triggered. A chain latch may be set, reset, or not altered at all in response to field 140. A fifth four bit field 142 is a chain latch identification field that specifies the chain latch to be altered by microcomputer 50 when the watchpoint is triggered. A sixth two bit field 144 is a trace enable field that microcomputer 50 responds to by enabling or disabling generation of a trace message upon triggering of the watchpoint. A seventh one bit field 146 is a trace message-type field that specifies the type of trace message generated by microcomputer 50 when the watchpoint is triggered. An eighth one bit field 148 is an enable trace time stamp field that specifies whether a time stamp is to be included in a trace message. A ninth one bit field 150 is a trigger-out enable field that microcomputer 50 responds to by enabling or disabling generation of a trigger-out message when the watchpoint is triggered. This field is used to generate a trigger out message over the trigger-out signal path of trigger-in/trigger-out interface 78. A tenth one bit field 152 is an operand address match enable field that determines whether a chain latch in debug module 72 and trace generation actions are dependent on a successful operand address data match. An eleventh one bit field 154 is a performance counter increment enable field that microcomputer 50 responds to by enabling or disabling incrementing of a performance counter if the watchpoint is triggered. A twelfth one bit field 156 is a reset all performance counters field that microcomputer 50 to responds to by resetting all performance counters when the watchpoint is triggered. A thirteenth four bit field 158 is a performance counter identification field that specifies the performance counter that is incremented when the watchpoint is triggered. A fourteenth field 160 is a system bus physical module number that specifies the identity of a system bus master module for the purpose of freezing the bus master when a watchpoint is triggered. A fifteenth one bit field 162 is a freeze enable field that specifies whether the system bus master specified by field 160 will be inhibited from generating further system bus transactions when a watchpoint is triggered. The remainder of the bits in action register 112 are reserved and may be assigned to other actions. More detailed information concerning the fields in action register 112 is depicted in the description of each field in FIGS. 6A–6G.

As with the preconditions defined in precondition register 110, the set of actions defined in action register 112 are identical for all watchpoints in the set of watchpoints. One skilled in the art will appreciate that other actions may be provided depending on the particular requirements of the microprocessor being debugged. One skilled in the art will also appreciate that not all of the actions defined in FIGS. 6A–6G need to be provided. For example, a set of actions could be defined for a particular microcomputer that have fewer actions or different actions from those illustrated in FIGS. 6A–6G.

Figure 7:
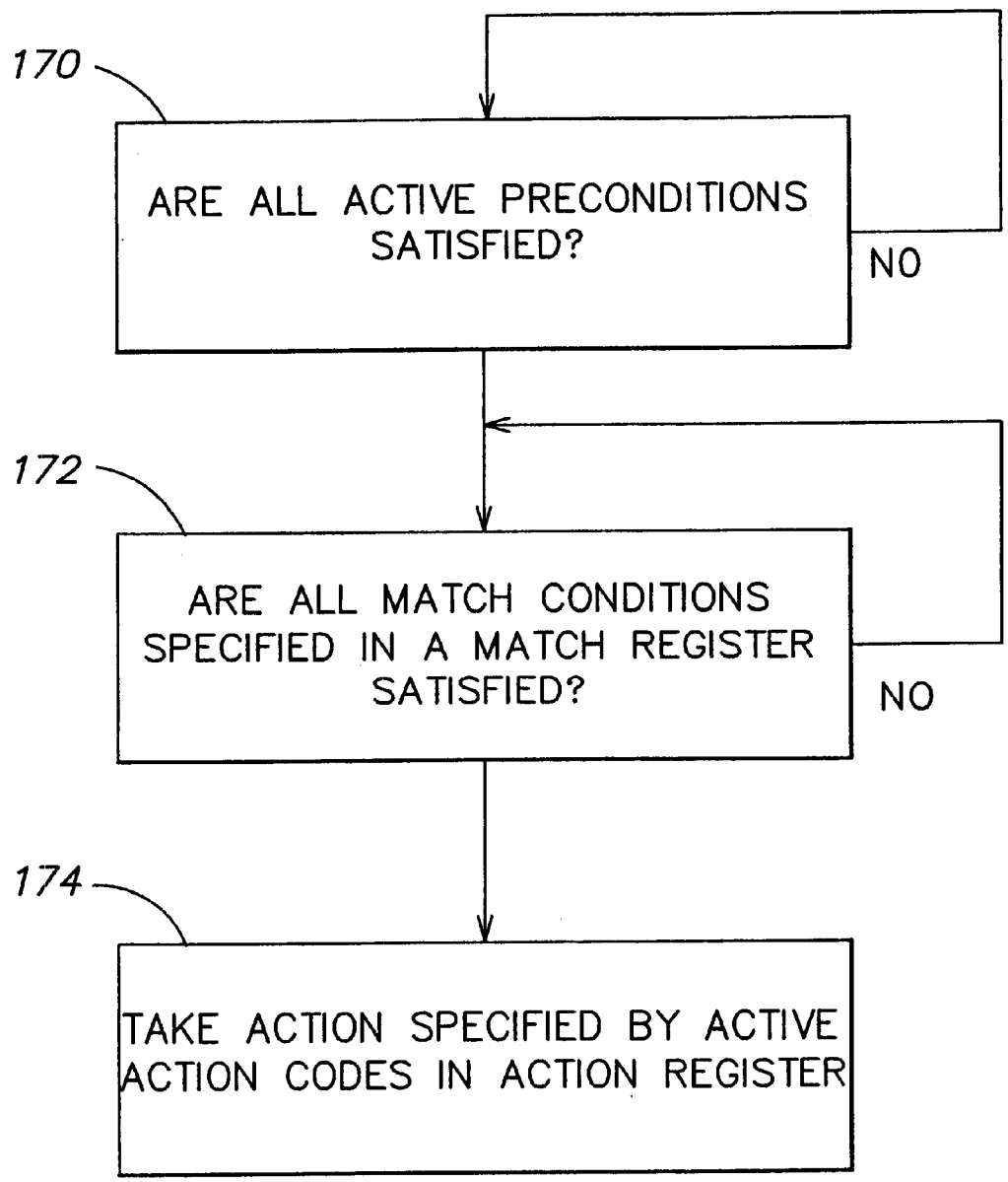
FIG. 7 is a flow chart illustrating the method by which watchpoints are triggered in accordance with the invention.

FIG. 7 illustrates a method according to the invention for triggering a watchpoint. Prior to execution of the steps illustrated in FIG. 7, microcomputer 50 is directed to activate certain ones of the precondition codes and certain ones of the action codes by writing to memory mapped registers 110 and 112 using standard techniques. The method begins at step 170 in which microcomputer 50 determines if all active preconditions specified in precondition register 110 have been satisfied. Active preconditions are those preconditions specified in precondition register 110 that have been enabled for a particular watchpoint. Microcomputer 50 makes the determination by comparing the active bits in register 110 with data values in the microcomputer. For example, if field 128 of precondition register 110 is active for a particular watchpoint, microcomputer 50 compares the 8-bit ASID value in field 128 with the ASID value of the microcomputer as the program is executing. When the value in field 128 matches the current ASID value, the precondition is satisfied. If all active preconditions have not been satisfied, the watchpoint remains disabled and cannot be triggered. On the other hand, if all the active preconditions have been satisfied, microcomputer 50 moves to step 172 in which it determines whether a match register has been defined for the watchpoint and whether all match conditions specified in match register 114 have been matched. Microcomputer 50 makes this determination by comparing the bits in match register 114 with data values in the microcomputer.

For example, if the watchpoint is an operand address watchpoint, match register 114 contains an address range and microcomputer 50 compares the address range in match register 114 with the current value of the address. When the address specified in match register 114 matches the current address, the match condition has been met. If all match conditions specified in match register 114 have not been matched, microcomputer 50 continues executing and monitoring the match conditions. On the other hand, if all match conditions specified in match register 114 have been met, the watchpoint is triggered and microcomputer 50 moves to step 174 in which microcomputer 50 reads the bits in the fields of action register 112. Microcomputer 50 then takes the action specified by any active action codes stored in action register 112.

Figure 8:
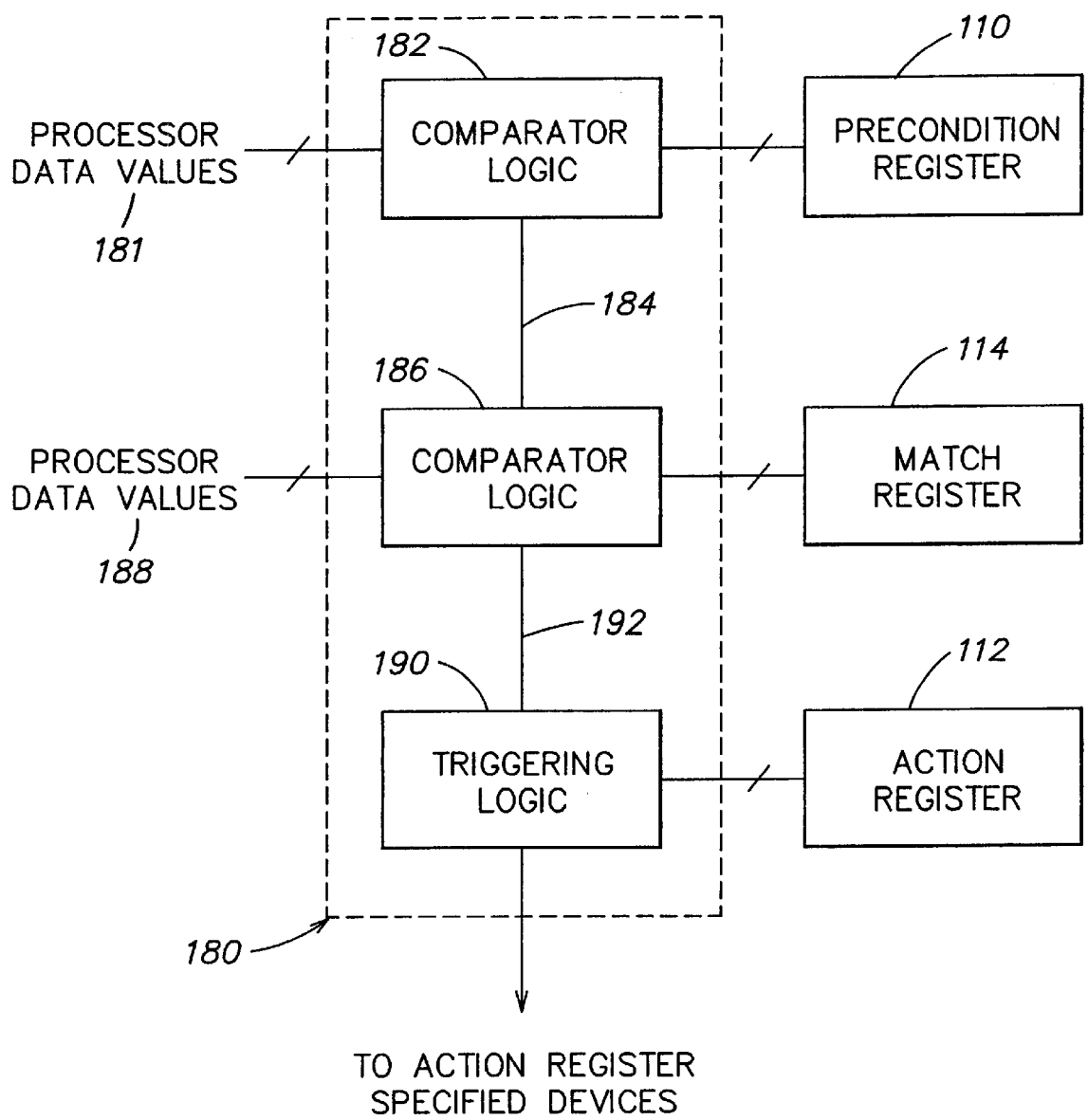
FIG. 8 illustrates circuitry for triggering watchpoints according to the invention.

A feature of the present invention is that debugging may be carried out non-intrusively, meaning that the actions taken to generate debugging information do not perturb operation of microcomputer 50. Since precondition register 110 and action register 112 and optional match register 114 are memory mapped, the contents of these registers can be read and the bits in the registers can be changed while microcomputer 50 is operating in a normal program execution mode. To make watchpoint triggering and debugging non-intrusive, dedicated comparing and triggering circuitry is provided within CPU watchpoint controller 54, debug module 72, and system bus analyzer 84. FIG. 8 illustrates this dedicated circuitry. For each watchpoint defined in microcomputer 50, a comparator and triggering logic circuit 180, constructed using combinatorial logic, is provided. Thus, two comparator and triggering logic circuits are provided in CPU watchpoint controller 54, two comparator and triggering logic circuits are provided in debug module 72, and two comparator and triggering logic circuits are provided in system bus analyzer 84. Comparator logic 182 includes at least one comparator that performs a bit wise comparison of the processor data values being monitored with the bits in the active fields of precondition register 110 by respectively ANDing the bits being monitored with the bits in the active fields of precondition register 110. When the active bits of precondition register 110 match the processor data values 181, comparator logic 182 generates an enable signal on line 184 that enables comparator logic 186. Comparator 186 then performs a bit-wise compare operation between the active bits of match register 114 and the processor data values specified by the match register by respectively ANDing the bits being monitored with the bits in the match register. If the processor data values 188 match the values specified in match register 114, the watchpoint is triggered and comparator logic 186 sends a signal to triggering logic 190 over connection 192. Triggering logic 190 performs a bit wise comparison using combinatorial logic between triggering signal 192 and the active bits of action register 112 by respectively ANDing the triggering signal 192 and the active bits of action register 112. When all signals are active, triggering logic 190 sends respective signals to the latches, devices, counters, exception handlers and so on specified in action register 112. Locating comparator and triggering logic 18 in each component where a watchpoint has been defined allows a precise exception model to be maintained in microcomputer 50 because the time between satisfaction of active preconditions and triggering of watchpoint is kept short, thus maintaining a more precise triggering of the watchpoint. Since the comparator and triggering logic is located in the portion of microcomputer 50 that is being monitored, watchpoints can be triggered without software intervention and without intrusively impacting operation of microcomputer 50.

Figure 9:
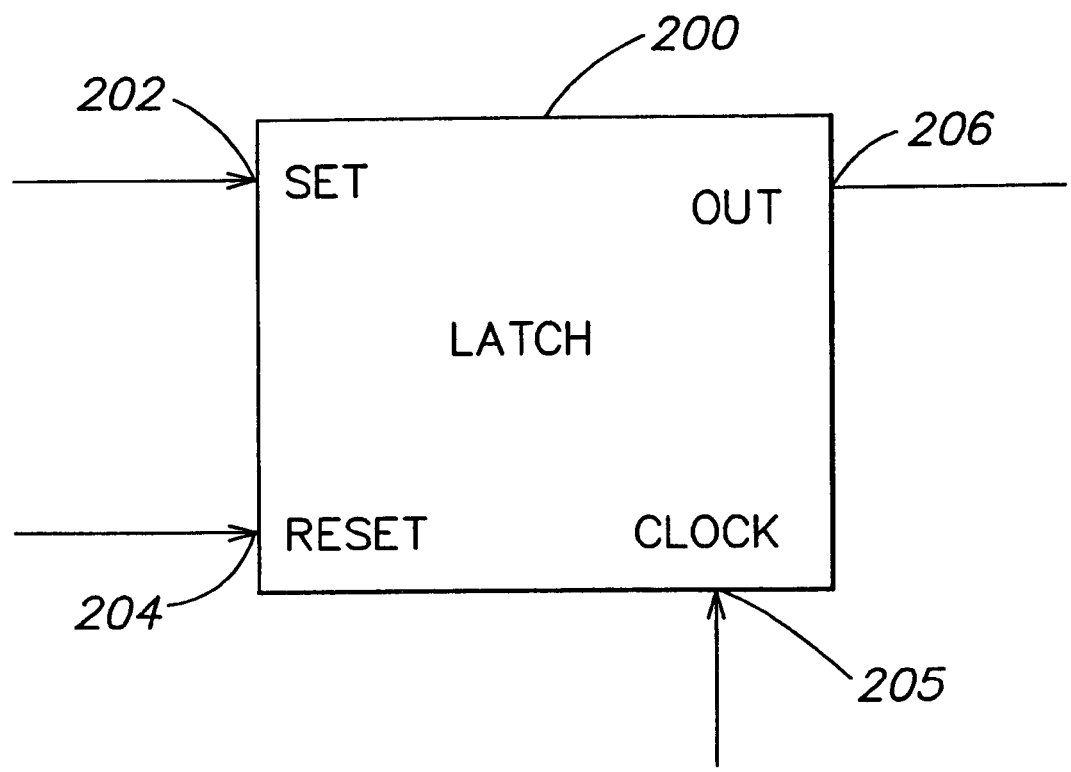
FIG. 9 illustrates a latch according to the invention.

As noted previously, one of the features of the invention is the inclusion of a set of latches, which may be termed "chain latches" in microcomputer 50. One example of such a latch is illustrated in FIG. 9. Latch 200 may be any type of latch. Latch 200 includes a set input 202, a reset input 204, a clock input 205, and an output 206. The set and reset inputs of latch 200 are coupled to triggering logic 190 and, when watchpoint is triggered, latch 200 is either set or reset depending on the state of bits six and seven in action register 112 illustrated in FIG. 6B. Clock input 205 receives a clock signal that is synchronized with the system clock.

As noted, a set of latches may be provided in microcomputer 50. There may be as many latches as there are watchpoints or there may be more latches than watchpoints or fewer latches than watchpoints. In FIGS. 5A–5C and 6A–6G, four bits are used to identify a chain latch and thus sixteen chain latches can be used. The set of latches allow multiple watchpoints to be chained together for debugging purposes. For example, upon triggering of a watchpoint, triggering logic 190 will read bits eight through eleven of action register 112 and send a signal to set input 202 or reset input 204 to set or reset latch 200 under control of clock input 205. As a result, triggering of a watchpoint is stored as a state bit in latch 200. The output 206 of latch 200 can be routed to bits three through six of precondition register 110 of another watchpoint. Thus, at the next microprocessor clock cycle after the first watchpoint has been triggered, the output state of latch 200 is available as a precondition to another watchpoint via its precondition register. The inclusion of latches in microcomputer 50 thus allows watchpoints to be chained together so that triggering of one watchpoint can be used to control triggering of other watchpoints. Furthermore, since precondition register 110 and action register 112 are programmable, different watchpoints can be chained together in flexible and arbitrary ways.

Figure 10A:
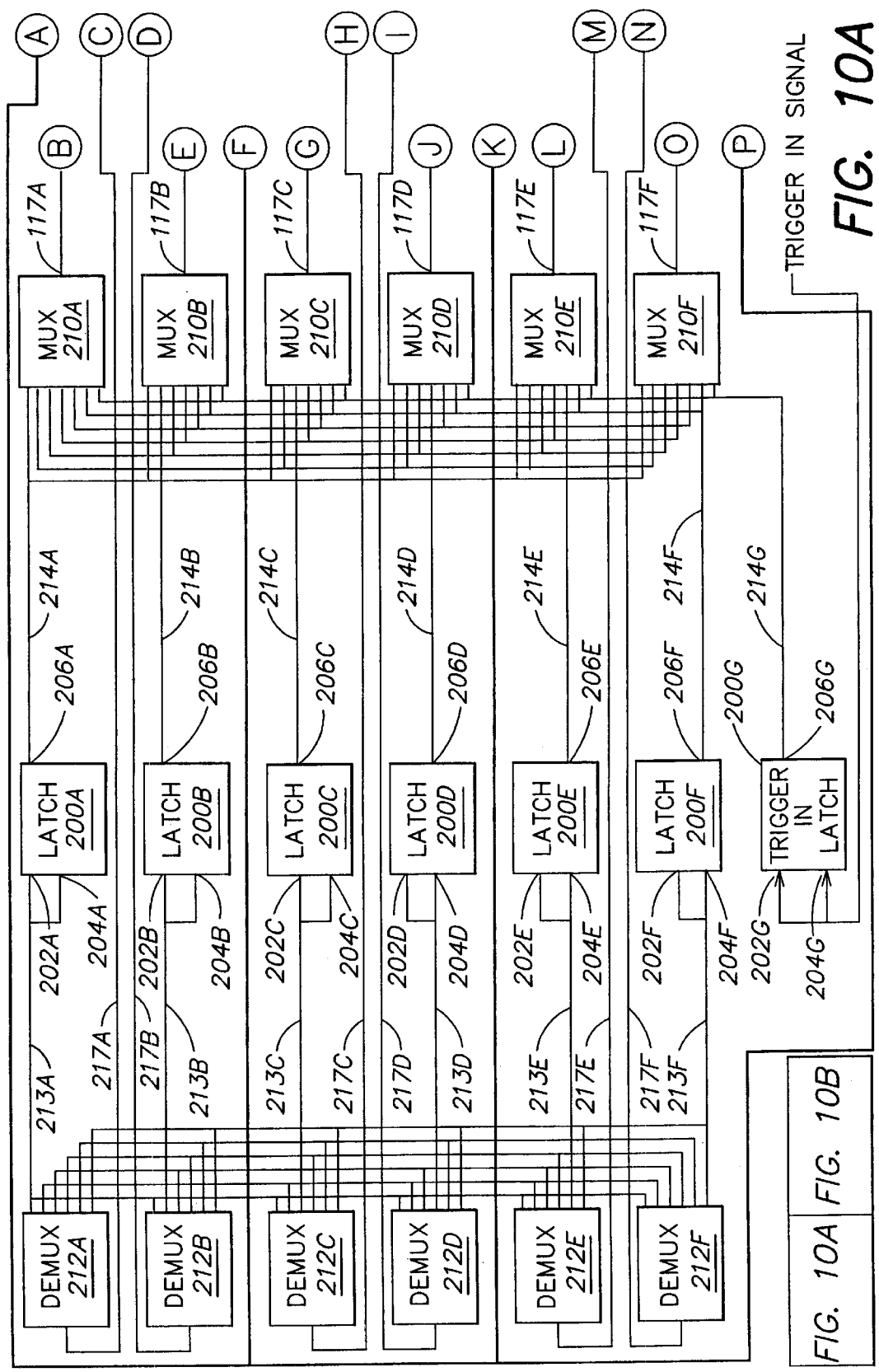
FIG. 10 illustrates how latches are used to link watchpoints according to the invention.
Figure 10B:
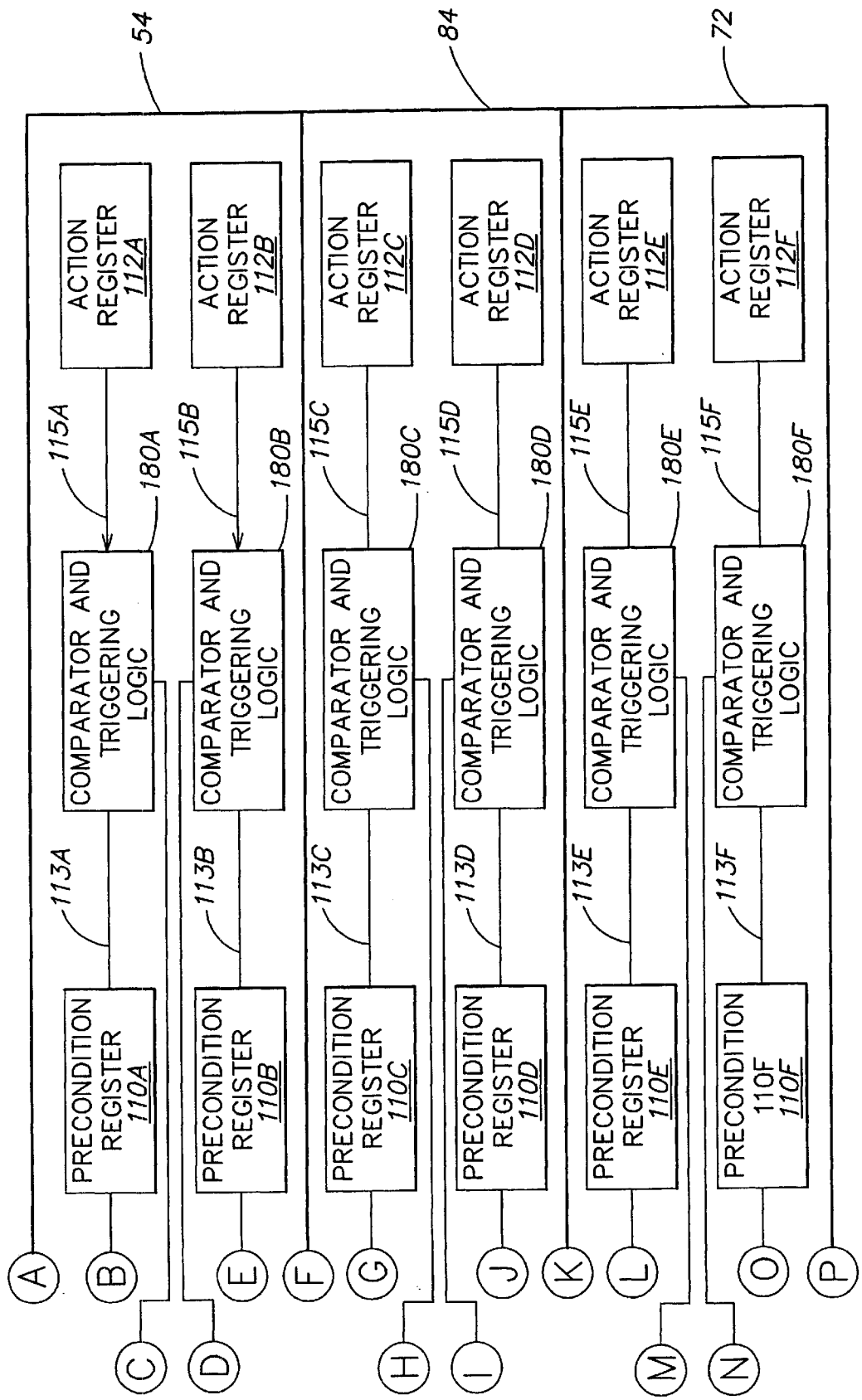

FIG. 10 illustrates one embodiment of microcomputer 50 including a set of watchpoints and chain latches according to the invention. FIG. 10 illustrates two watchpoints defined in CPU watchpoint controller 54 two chain latches 200 and two comparator and triggering logic circuits 180, two watchpoints defined in system bus analyzer 84, two chain latches 200 and two comparator and triggering logic circuits 180, and two watchpoints defined in debug module 72, two chain latches 200 and two comparator and triggering logic circuits 180. As noted previously, each watchpoint includes a precondition register 110A–110F and an action register 112A–112F. Each watchpoint also includes comparator and triggering logic 180A–180F. As explained in connection with FIG. 8, the bits of precondition register 110A–110F and the bits of action register 112A–112F are respectively wired to comparator triggering logic 180A–180F via connections 113A–113F and 115A–115F. A set of chain latches 200A–200F is also provided. In addition, an additional trigger-in latch 200G is provided in debug module 72. Trigger-in latch 200G may be the same type of latch as latches 200A–200F. Latch 200G responds to a trigger-in signal on trigger-in/trigger-out interface 78 which can be used by an external system, such as a logic analyzer, as a precondition for a watchpoint. Latch 200G may also be associated with a memory-mapped register that allows system software or an external signal to directly set or reset the latch.

In order to provide full connectivity between each watchpoint in microcomputer 50, each latch is associated with a multiplexer 210A–210F and a demultiplexer 212A–212F. Each multiplexer 210A–210F has a select output signal respectively coupled to bits three through six of precondition register 110A–110F over connections 117A–117F. Each multiplexer has a number of inputs that are connected to each output 206A–206G of latches 200A–200G, via connections 214A–214G. Each latch has its set input 202A–202F and reset input 204A–204F respectively connected to the outputs of demultiplexers 212A–212F over connections 213A–213F. Comparator and triggering logic 180A–180F is respectively coupled to demultiplexers 212A–212F via connections 217A–217F.

In operation, any watchpoint comprising a precondition register 110, an action register 114, and a comparator and triggering logic circuit 180 can be tied to any other watchpoint using connecting circuitry comprising a multiplexer 210, a latch 200, and a demultiplexer 212. For example, suppose triggering of a debug module watchpoint comprising precondition register 110E, action register 112E, and comparator triggering logic 180E is desired to be made dependent on a CPU watchpoint comprising precondition register 110A action register 112A, and comparator and triggering logic 180A. Precondition register 110A is programmed to enable any desired precondition codes in the set of precondition codes. Action register 112A is programmed to activate any desired action does in the set of action codes and in particular, field 142 of action register 112A is programmed with a four bit code that identifies latch 200C. Field 140 of action register 112A is programmed to set latch 200C upon triggering of the watchpoint. Precondition register 110E is programmed to enable any desired precondition codes in the set of precondition codes and in particular, field 120 of precondition register 110E is programmed to enable inclusion of a latch in the preconditions and field 122 of precondition register 110E programmed with a four bit code that identifies latch 200C. Action register 112E is programmed to activate any desired action does in the set of action codes.

Thereafter, during program execution, when all the active preconditions specified (and any additional match conditions in an optional match register have been matched) the watchpoint triggers and comparator and triggering logic 180A sends a select signal to demultiplexer 212A in response to field 142 of action register 112A. Demultiplexer 212A responds to this signal to select latch 202C and set the latch in response to field 140 of action register 112A and a clock signal on clock input 205A.

At the next clock cycle, the output of latch 200 is provided to all multiplexers 210A–210F. Muliplexer 210E responds to field 122 of precondition register 110E to select the output 206C of latch 200C. When all the preconditions specified in precondition register 110E have been satisfied (and any additional match conditions in an optional match register have been matched) the watchpoint triggers and comparator and triggering logic 180E responds to action register 112E to respond to active action codes in action register 112E.

The above example illustrates that any latch and any watchpoint in the microcomputer can be coupled together. In particular, the above example analyzer illustrates a latch in the system bus analyzer being used to couple a CPU watchpoint to a debug module watchpoint.

It will be appreciated that multiple precondition registers can respond to a single latch output. It will also be appreciated that multiple action registers can set or reset a single latch.

As a result of the circuitry illustrated in FIG. 10 and provided in microcomputer 50 full connectivity is provided among watchpoints in the microcomputer. Any watchpoint can be used to, through a chain latch, participate in the preconditions of any other watchpoint in the microcomputer. Watchpoints can be combined in arbitrary ways. This allows useful and sophisticated filtering of debugging data to be provided. For example, two watchpoints can be ANDed together so that they enable a third watchpoint when they are both triggered. In another example, one watchpoint can be used to set a chain latch that enables a second watchpoint and a third watchpoint can be used to reset the chain latch so as to disable the second watchpoint. In another example, groups of watchpoints can be combined to provide this enabling and disabling function. For example, a group of watchpoints can be ORed together to enable a watchpoint and another group of watchpoints can be ORed together to disable that watchpoint.

When the watchpoints of the invention having programmable precondition registers and action registers are combined in arbitrary ways through the use of chain latches, powerful and sophisticated debugging operations as well as filtering of debugging data can be accomplished, in a straightforward manner.

The filtering function provided by the combination of uniformly programmable watchpoints in conjunction with latches for tying watchpoint triggering events together allows sophisticated and complex debugging operations to be carried out on-chip without an undue increase in the amount of circuitry needed in microcomputer 50. In addition, since the ability to carry out complex debugging operations is provided on chip, an external, expensive logic analyzer is no longer needed. Also, since the programmable watchpoints and latches can be used as filters for debugging information, the amount of trace information being sent off-chip can be greatly reduced since a significant portion of the processing of the debug data can occur on-chip.

Figure 11:
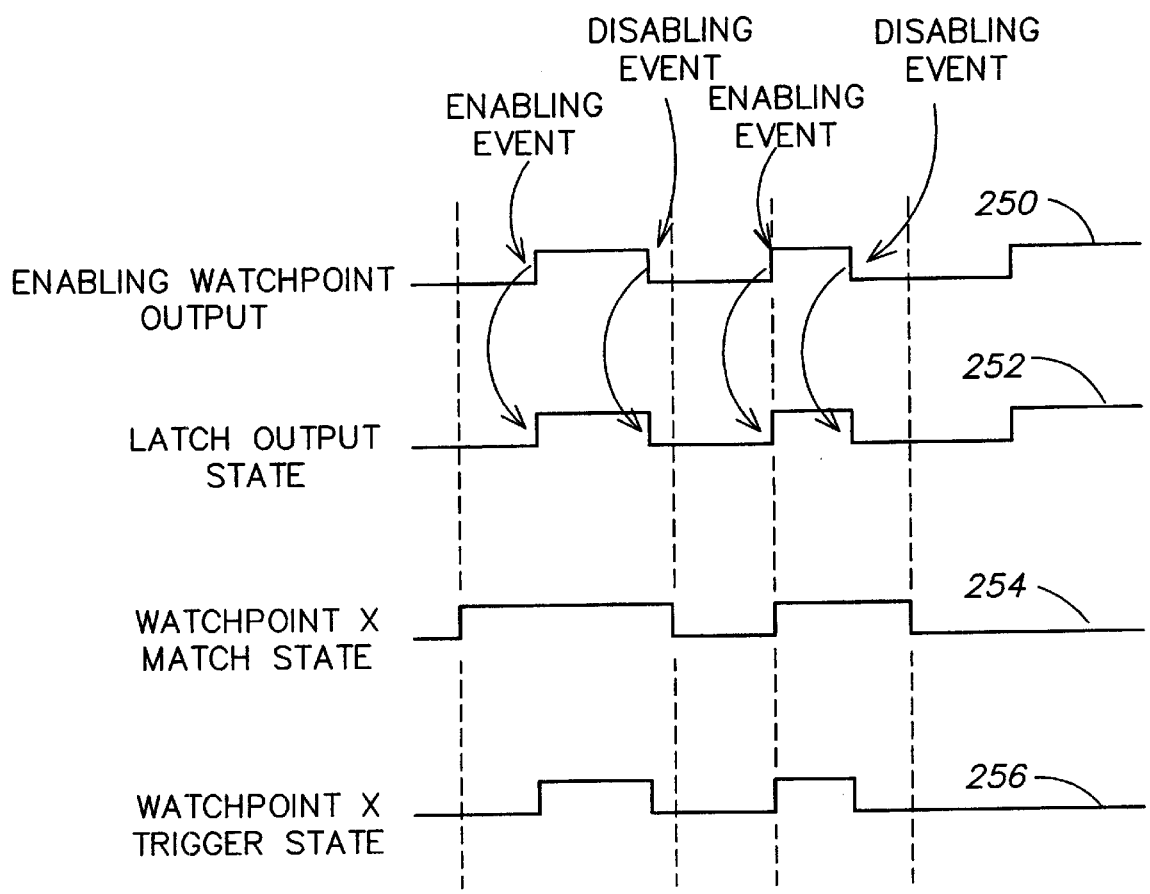
FIG. 11 illustrates how two watchpoints may be ANDed together according to the invention.

Reference is now made to FIG. 11, which figures illustrates how the operation of two watchpoints can be ANDed together. Signal 250 illustrates the output of an arbitrary watchpoint. A series of enabling and disabling events are generated by triggering of the watchpoint. An enabling event is generated whenever the output of the enabling watchpoint transitions to a high logic level and a disabling event is generated whenever the output of the enabling watchpoint transitions to a low level. The enabling watchpoint is coupled to a latch that is set whenever an enabling event occurs on the enabling watchpoint and is reset whenever a disabling event occurs on the enabling watchpoint. Signal 252 illustrates that the latch output state transitions to a high logic level when the enabling watchpoint generates an enabling event and transitions to a low logic level whenever the enabling watchpoint generates a disabling event. The latch output state is coupled to a precondition register for a watchpoint X. Signal 254 illustrates that watchpoint X so enabled by its precondition register whenever signal 254 is at a high logic level and is disabled by its precondition register whenever signal 254 is at a low logic level. Signal 256 illustrates when watchpoint X triggers. Signal 256 is at a high logic level, indicating that watchpoint X has been triggered whenever signals 250 and 254 are at a high level and signal 256 is at a low logic level indicating that watchpoint X has not been triggered whenever signals 250 and 254 are not at a high logic level. Thus, watchpoint X will only trigger when the enabling watchpoint has triggered and when the preconditions of watchpoint X have been satisfied. Triggering of watchpoints occurs on a rising or falling clock edge.

Figure 12:
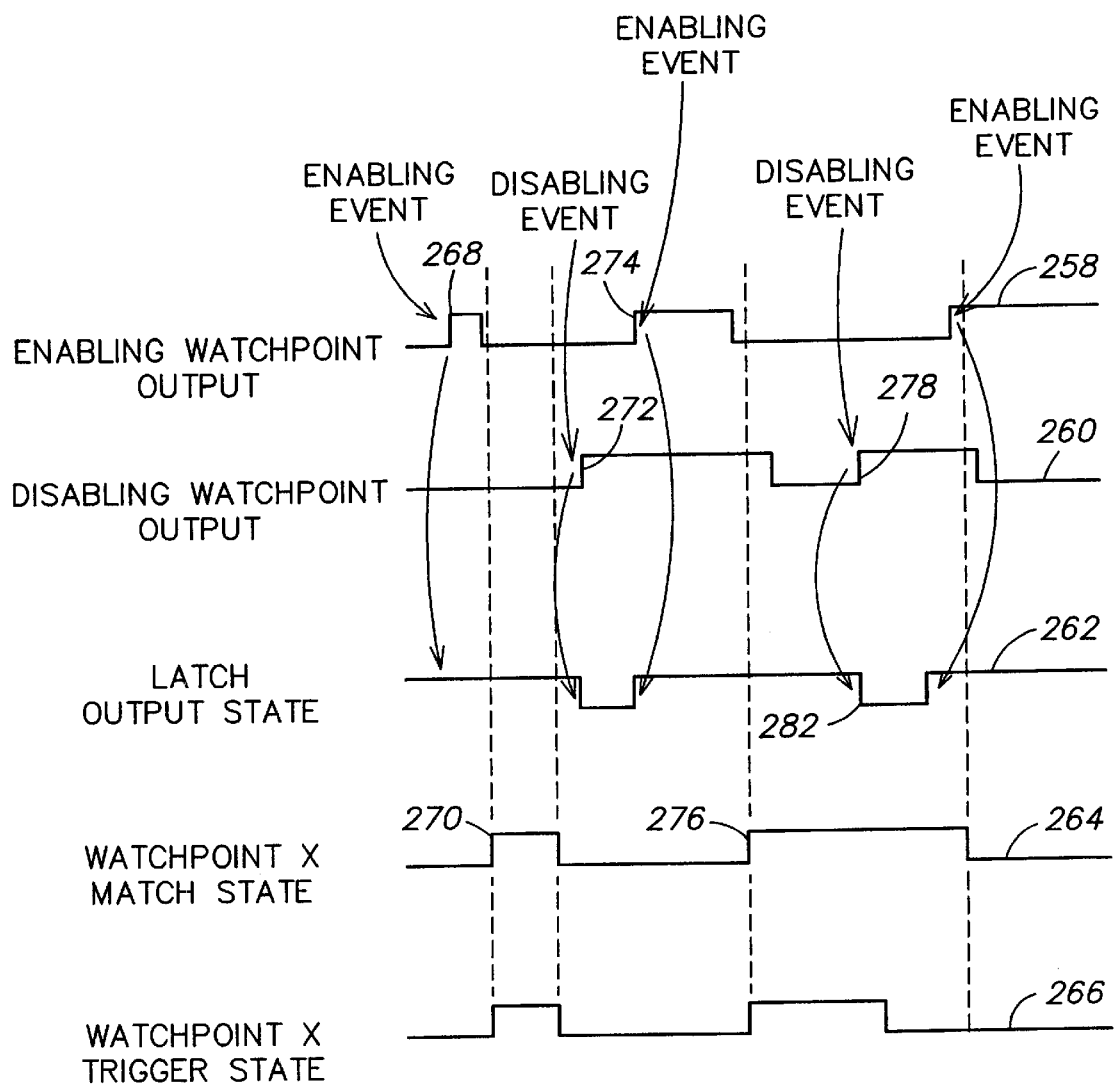
FIG. 12 illustrates how two watchpoints can enable and disable a third watchpoint.

FIG. 12 illustrates how one watchpoint can be enabled by a second watchpoint and disabled by a third watchpoint. In FIG. 12, signal 258 is the output of an enabling watchpoint that is used to set a latch. Signal 260 is the output of the disabling watchpoint that is used to reset the latch. The output of the latch is provided as a precondition to the precondition register of watchpoint X. Watchpoint X has its own precondition register that defines the conditions under which watchpoint X is enabled. Signal 266 represents the state of watchpoint X when it is triggered, transitioning to a high logic level when the watchpoint is triggered and transitioning to a low logic level and the watchpoint is not triggered. As a result, signal 266 will transition to a high logic level when signal 262 is at a high logic level and signal 264 is at a high logic level.

The sequence of events is as follows. When watchpoint output 258 transitions to a high logic level in region 268, an enabling event occurs. This sets the latch output state to a high logic level. Watchpoint X is thus enabled but does not trigger until a first match in region 270 occurs when signal 264 transitions to a high logic level. Subsequently, signal 260 transitions from a low logic level to a high logic level to generate a disabling event in region 272. This transition of signal 260 resets the latch that the logic level on signal 262 transitions from a high logic level to a low logic level. During this time, signal 264 has also transitioned to a low logic level so that watchpoint X is no longer enabled and thus watchpoint X does not trigger. Subsequently, signal 258 transitions from a low logic level to a high logic level in region 274 generating an enabling event to cause signal 262 to transition from a low logic level to a high logic level. However, since signal 264 is still at a low logic level, watchpoint X does not trigger but only triggers when signal 264 transitions to a high logic level and a second match occurs in region 276. Subsequently, signal 260 transitions from a low logic level to a high logic level to generate a disabling watchpoint output in region 278 which clears the latch so that signal 262 transitions from a high logic level to a low logic level. Subsequently, signal 258 transitions from a low logic level to a high logic level to generate an enabling event that sets the latch and causes signal 262 to transition from a low logic level to a high logic level. Triggering of watchpoints occurs on a rising or falling clock edge.

Figure 13:
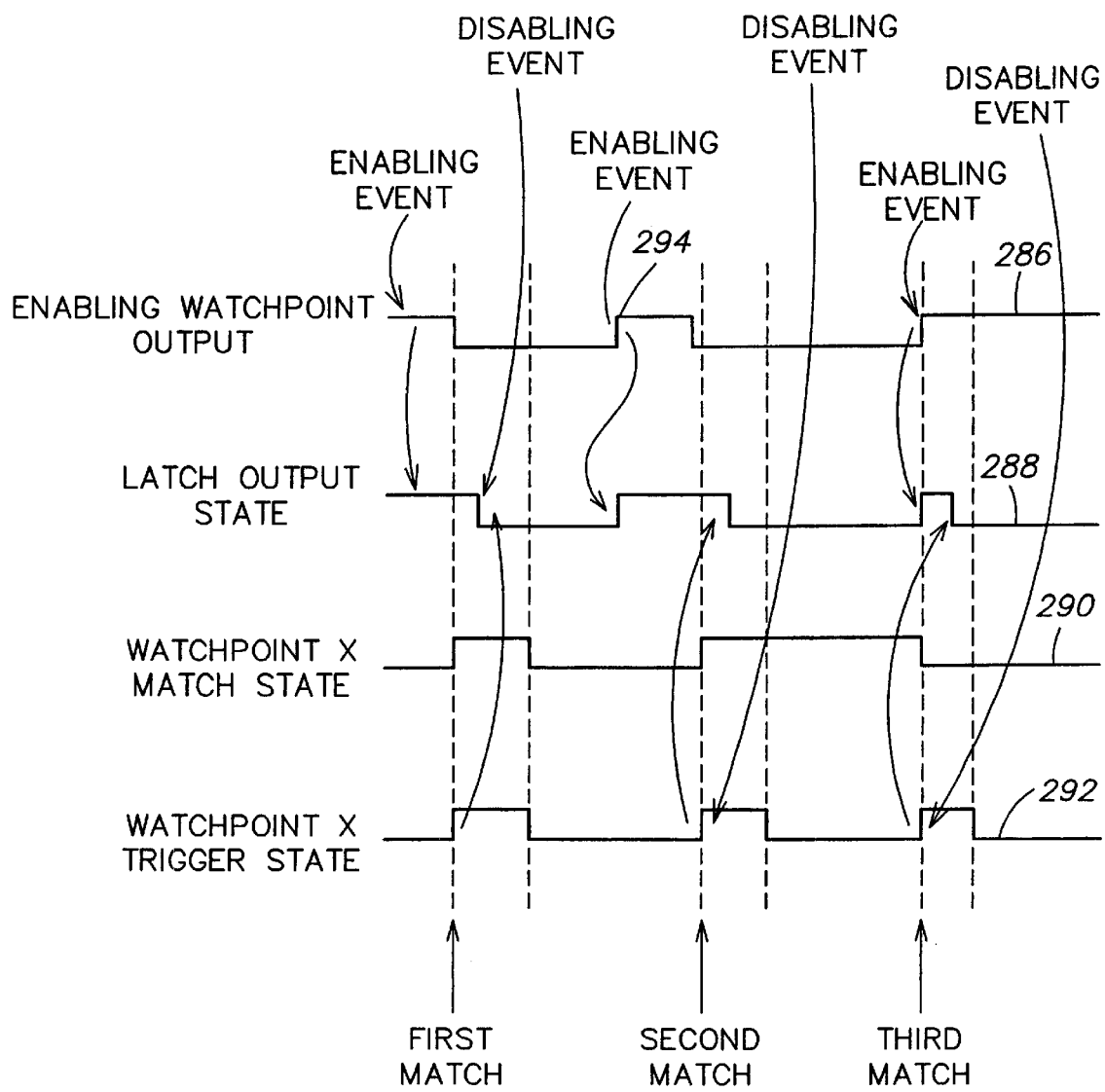
FIG. 13 illustrates how two watchpoints can enable and disable a third watchpoint wherein the first or second watchpoint is the same as the third watchpoint.

FIG. 13 illustrates the same type of sequencing as FIG. 12 except that watchpoint X is both the watchpoint being enabled and also generates disabling events. Whenever watchpoint X triggers as a result of an enabling event generated by the enabling watchpoint output on line 286, watchpoint X also generates a disenabling event to reset the latch so that the latch output state signal 288 transitions from a high logic level to a low logic level. The latch must be reset by the next enabling event 294 in order to reenable watchpoint X. This example of watchpoint programming causes watchpoint X to disable the enabling condition which then must occur again in order for watchpoint X to be triggered again. Triggering of watchpoints occurs on a rising or falling clock edge.

Figure 14:
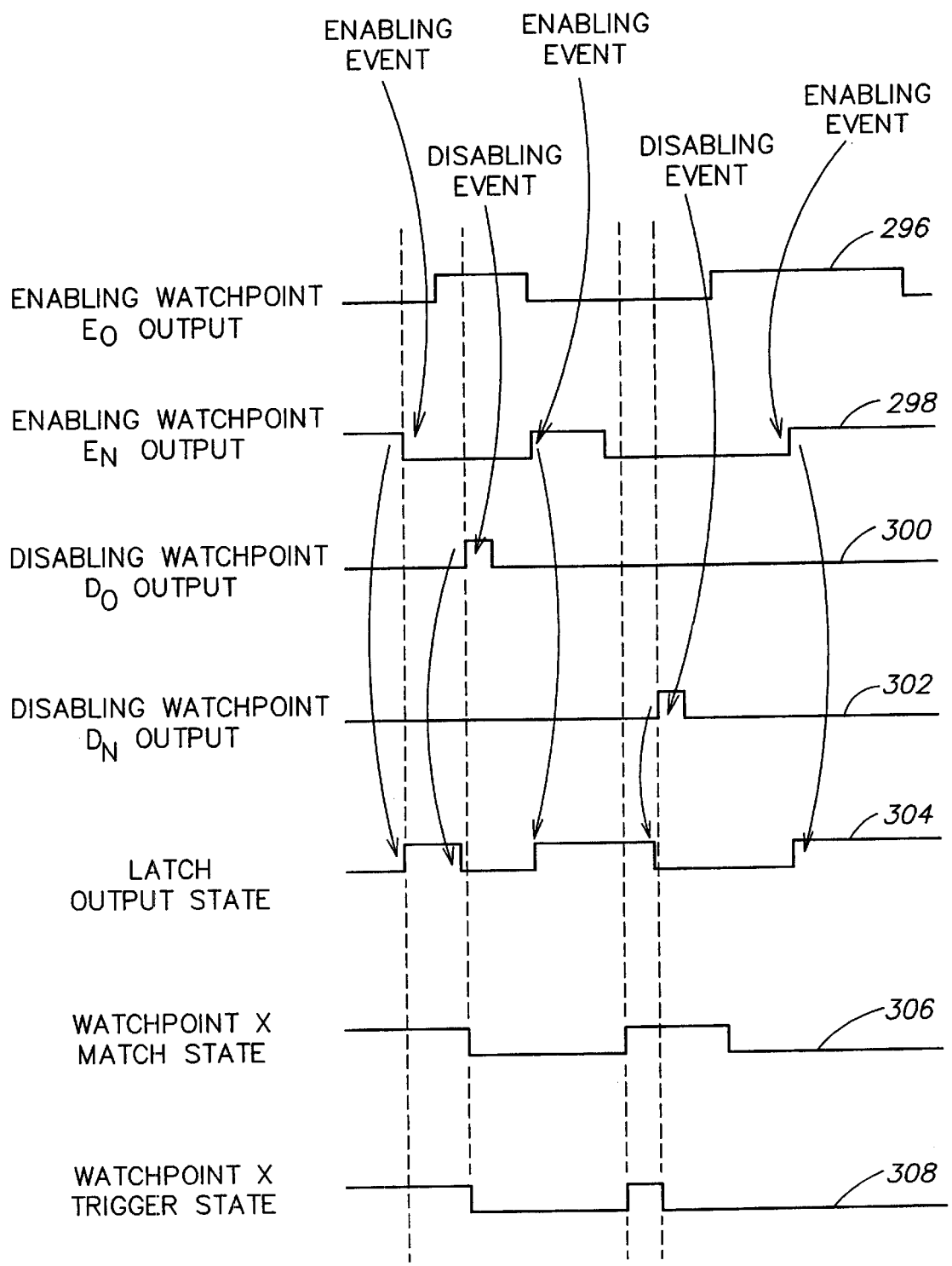
FIG. 14 illustrates how any watchpoint in a group of watchpoints may enable a third watchpoint and any watchpoint in another group of watchpoints may disable the third watchpoint.

FIG. 14 illustrates another example similar to FIG. 12. In FIG. 14, multiple watchpoints $E_O$–$E_N$ are ORed together with multiple disabling watchpoints E–$E_O$ so that triggering of any one watchpoints $E_O$–$E_N$ will enable watchpoint X and triggering of any one of watchpoints $D_O$–$D_N$ will disable watchpoint X. Triggering of any watchpoints $E_O$–$E_N$, triggering of any of watchpoints $D_O$–$D_N$, and triggering of watchpoint X occurs on a rising or falling clock edge.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A computer system, comprising:

at least one central processing unit;

a memory unit coupled to the at least one central processing unit, a set of watchpoints defined in the computer system, each watchpoint in the set of watchpoints comprising a programmable precondition register and a programmable action register;

a set of latches; and selection circuitry that selects one latch in the set of latches to couple an output of an action register to an input of the selected latch.

2. The computer system of claim 1, wherein the selection circuitry comprises a demultiplexer having an input coupled to the output of the action register and a plurality of outputs each respectively coupled to an input of each latch in the set of latches.

3. The computer system of claim 2, wherein the selection circuitry comprises a multiplexer having a plurality of inputs each respectively coupled to an output of each latch in the set of latches and an input coupled to a precondition register.

4. The computer system of claim of claim 3, further comprising a set of demultiplexers corresponding to the set of watchpoints, each demultiplexer in the set of demultiplexers having an input respectively coupled to an output of a respective action register in the set of watchpoints, each demultiplexer in the set of demultiplexers having a plurality of outputs respectively coupled to an input of each latch in the set of latches.

5. The computer system of claim 4, further comprising a set of multiplexers corresponding to the set of watchpoints, each multiplexer in the set of multiplexers having a plurality of inputs respectively coupled to an output of each latch in the set of latches, each multiplexer in the set of multiplexers having an output coupled to an input of a respective precondition register in the set of watchpoints.

6. The computer system of claim 5, further comprising a control register respectively associated with a latch in the set of latches, the control register having a state, responsive to a signal external to the computer system, that sets or resets the latch.

7. The computer system of claim 6, implemented on a single integrated circuit chip.

8. The computer system of claim 5, wherein each demultiplexer has a select output, responsive to a state of a respective action register, that controls the demultiplexer to select an input of one latch in the set of latches.

9. The computer system of claim 4, wherein each multiplexer has a select input, responsive to a state of a respective precondition register, that controls each multiplexer to select an output of one latch in the set of latches.

10. The computer system of claim 3, wherein the multiplexer includes a select input, responsive to a state of the precondition register, that controls the multiplexer to select an output of one latch in the set of latches.

11. The computer system of claim 2, wherein the demultiplexer includes a select output, responsive to a state of the action register, that controls the demultiplexer to select an input of one latch in the set of latches.

12. The computer system of claim 1, wherein the precondition register stores a set of precondition codes, wherein the set of precondition codes is identical for each watchpoint in the set of watchpoints.

13. The computer system of claim 12, wherein the action register stores a set of action codes, wherein the set of action codes is identical for each watchpoint in the set of watchpoints.

14. The computer system of claim 13, wherein the computer system includes hardware and software that selects which precondition codes in the set of precondition codes are active for a particular watchpoint in the set of watchpoints.

15. The computer system of claim 13, wherein the computer system includes hardware and software that selects which action codes in the set of action codes are active for a particular watchpoint in the set of watchpoints.

16. The computer system of claim 13, wherein the set of watchpoints includes types of watchpoints for operand addresses, instruction values, instruction addresses, branches, breakpoint instructions, and printf instructions.

17. The computer system of claim 16, wherein each watchpoint further comprises a programmable match register that stores at least one match code, wherein the match code stored depends on the type of watchpoint.

18. The computer system of claim 17, wherein the match code includes at least one of an address range, a data value, a data mask, an instruction value, an instruction mask, and a branch type.

19. The computer system of claim 12, wherein the set of precondition codes includes a basic enable code, an address space identifier enable code, an address space identifier code, a latch enable code, a latch identifier code, an event counter enable code, an even counter identifier code, an ISA mode enable code, and a CPU supervisor mode selection code.

20. The computer system of claim 13, wherein the set of action codes includes an exception enable code, an event count decrement enable code, an event counter identifier code, a latch alter code, a latch identifier code, a performance counter increment enable code, a reset all performance counters code, a performance counter identifier code, a trace enable code, a trace message type code, an enable trace time stamp code, a trigger out enable code, and an interrupt enable code.

21. A computer system, comprising:
    at least one central processing unit;
    a memory unit coupled to the at least one central processing unit;
    a set of watchpoints defined in the computer system; and
    means for linking one watchpoint in the set of watchpoints with at least one other watchpoint in the set of watchpoints, wherein the means for linking is programmable;
    wherein the means for linking includes, associated with each watchpoint, a programmable precondition register that stores a set of precondition codes, wherein the set of precondition codes is identical for each watchpoint in the set of watch points.

22. The computer system of claim 21, wherein the means for linking further includes, associated with each watchpoint, a programmable action register that stores a set of action codes, wherein the set of action codes is identical for each watchpoint in the set of watchpoints.

23. The computer system of claim 22, wherein the means for linking further comprises a latch.

24. The computer system of claims 23, wherein the latch is coupled between an output of an action register associated with one watchpoint in the set of watchpoints and an input of every input of every other precondition register in the set of watchpoints.

25. A method of operating a computer system comprising at least one central processing unit and a memory unit coupled to the at least one central processing unit, the method comprising the steps of:
    defining a set of watchpoints in the computer system by defining a set of precondition registers and a set of action registers;
    defining a set of identical precondition codes to be applied to each watchpoint in the set of watchpoints;
    defining a set of identical action codes to be applied to each watchpoint in the set of watchpoints;
    storing the set of precondition codes in each precondition register in the set of precondition registers;
    storing the set of action codes in each action register in the set of action registers;
    selecting which precondition codes in the set of precondition codes are to be active for a particular watchpoint;
    selecting which action code in the set of action codes are to be active for a particular watchpoint;
    operating the computer system so as to execute a program;
    comparing the debugging data in the computer system with the active precondition codes for a particular watchpoint;
    sending a signal to the action register for the particular watchpoint when the debugging data in the computer system satisfies the active precondition codes for the particular watchpoint; and
    wherein the computer system responds to the active action code by generating a trigger signal and the computer system further responds to the trigger signal by setting or clearing a latch in response to a state of the trigger signal.

26. The method of claim 25, wherein the computer system comprises a set of latches and the method further comprises the step of selecting a latch in the set of latches to respond to the trigger signal.

27. The method of claim 26, further comprising the step of providing an output signal from the latch to each precondition register in the set of watchpoints.

28. The method of claim 27, further comprising the step of selecting a precondition register to respond to the output signal from the latch.

29. The method of claim 25, wherein the set of watchpoints includes types of watchpoints for operand addresses, instruction values, instruction addresses, branches, breakpoint instructions, and printf instructions.

30. The method of claim 29, wherein the set of precondition codes includes a basic enable code, an address space identifier enable code, an address space identifier code, a latch enable code, a latch identifier code, an event counter enable code, an even counter identifier code, an ISA mode enable code, and a CPU supervisor mode selection code.

31. The method of claim 30, wherein the set of action codes includes an exception enable code, an event count decrement enable code, an event counter identifier code, a latch alter code, a latch identifier code, a performance counter increment enable code, a reset all performance counters code, a performance counter identifier code, a trace enable code, a trace message type code, an enable trace time stamp code, a trigger out enable code, and an interrupt enable code.

32. The method of claim 31, comprising the step of defining a programmable match register and storing an at least one match code in the match register, wherein the match code stand depends on the type of watchpoint.

33. The method of claim 32, further comprising the step of comparing, after the at least one precondition code has been satisfied, the at least one match code with a second data value in the computer system.

34. The method of claim 33, wherein the signal is provided to the action register if the second data value matches the match code.

35. The method of claim 32, further comprising the step of defining the precondition register, the match register, and the action register in respective memory locations in the memory unit.

* * * * *